US012807063B2

(12) United States Patent
Barrellon et al.

(10) Patent No.: US 12,807,063 B2
(45) Date of Patent: Nov. 24, 2026

(54) DYNAMICALLY-CONTROLLED AUTOMATIC TURN SIGNAL CANCELLATION IN A VEHICLE

(71) Applicant: Volvo Truck Corporation, Gothenburg (SE)

(72) Inventors: Remi Barrellon, Simandres (FR); Oriana Gonzalez Mosquera, Lyons (FR); David De Brito, Charvieu-Chavagneux (FR)

(73) Assignee: Volvo Truck Corporation, Gothenburg (SE)

( * ) Notice: Subject to any disclaimer, the term of this patent is extended or adjusted under 35 U.S.C. 154(b) by 317 days.

(21) Appl. No.: 18/811,558

(22) Filed: Aug. 21, 2024

(65) Prior Publication Data

US 2025/0170952 A1 May 29, 2025

(30) Foreign Application Priority Data

Nov. 24, 2023 (EP) .................................... 23212005

(51) Int. Cl.
*B60Q 1/42* (2006.01)

(52) U.S. Cl.
CPC ............ *B60Q 1/42* (2013.01); *B60Q 2900/50* (2022.05)

(58) Field of Classification Search
None
See application file for complete search history.

(56) References Cited

U.S. PATENT DOCUMENTS 6,975,218 B2 12/2005 Madau
11,772,646 B2 10/2023 Fujita et al.
(Continued)

FOREIGN PATENT DOCUMENTS

CN 112399932 B 10/2024
DE 102011085822 A1 5/2013
(Continued)

OTHER PUBLICATIONS

Extended European Search Report for European Patent Application No. 23212005.5, mailed Apr. 17, 2024, 7 pages.
(Continued)

*Primary Examiner* — James J Lee
*Assistant Examiner* — Elizabeth Galyn Martinez
(74) *Attorney, Agent, or Firm* — Withrow & Terranova, PLLC

(57) ABSTRACT

Dynamic speed-controlled automatic turn signal cancellation in a vehicle. An automatic turn signal cancellation system is configured detect steering wheel angle changes to indicate a vehicle turn and then a steering wheel angle returning towards turn neutral position for canceling turn signal. If steering wheel angle remains in the turn neutral position for a determined stability time, the turn is deemed completed and the turn signal is automatically cancelled. The stability time is dynamically determined inversely related to maximum steering wheel angle of the turn, because a steering wheel will return to a stable position faster from a larger steering wheel motion from a sharper turn. The automatic turn signal cancellation system can also dynamically set a threshold angle used to determine initial vehicle turn based on the speed of the vehicle because the faster the vehicle speed, the less steering wheel angle change is required to perform a turn.

19 Claims, 11 Drawing Sheets

(56) References Cited

U.S. PATENT DOCUMENTS

| | | | | |
|---|---|---|---|---|
| 12,377,776 | B2 | 8/2025 | Pendleton et al. | |
| 2004/0100373 | A1 * | 5/2004 | Ponziani | B60Q 1/346 340/476 |
| 2010/0013624 | A1 | 1/2010 | Groeller et al. | |
| 2010/0219051 | A1 | 9/2010 | Shimizu et al. | |
| 2010/0308988 | A1 | 12/2010 | Ieda et al. | |
| 2015/0210208 | A1 | 7/2015 | Suzuki | |
| 2016/0129831 | A1 | 5/2016 | Liotti et al. | |
| 2020/0122632 | A1 | 4/2020 | Nojiri et al. | |
| 2021/0268957 | A1 | 9/2021 | Fujita et al. | |
| 2022/0118903 | A1 | 4/2022 | Cristini et al. | |
| 2025/0170951 | A1 | 5/2025 | Barrellon et al. | |
| 2025/0170952 | A1 | 5/2025 | Barrellon et al. | |
| 2025/0319814 | A1 | 10/2025 | Graham | |

FOREIGN PATENT DOCUMENTS

| | | | | |
|---|---|---|---|---|
| DE | 102023115824 | A1 | 12/2024 | |
| EP | 2815921 | A1 | 12/2014 | |
| EP | 4559752 | A1 | 5/2025 | |
| EP | 4559753 | A1 | 5/2025 | |
| FR | 2967376 | A1 | 5/2012 | |
| IN | 202241069133 | A | 12/2022 | |
| JP | 5399884 | B2 | 1/2014 | |
| JP | 5576087 | B2 | 8/2014 | |
| JP | 6538540 | B2 | 7/2019 | |
| WO | 2020012212 | A1 | 1/2020 | |
| WO | WO-2020173543 | A1 * | 9/2020 | B60K 35/10 |

OTHER PUBLICATIONS

Extended European Search Report for European Patent Application No. 23212002.2, mailed Apr. 16, 2024, 10 pages.
Summons to Attend Oral Proceedings for European Patent Application No. 23212005.5, mailed Apr. 2, 2026, 8 pages.
Intention to Grant for European Patent Application No. 23212005.5, mailed Jun. 2, 2026, 56 pages.

* cited by examiner

DYNAMICALLY-CONTROLLED AUTOMATIC TURN SIGNAL CANCELLATION IN A VEHICLE

PRIORITY APPLICATIONS

The present application claims priority to European Patent Application No. 23212005.5, filed on Nov. 24, 2023, and entitled "DYNAMICALLY-CONTROLLED AUTOMATIC TURN SIGNAL CANCELLATION IN A VEHICLE," which is incorporated herein by reference in its entirety.

TECHNICAL FIELD

The disclosure relates generally to turn signaling operation in vehicles. In particular aspects, the disclosure relates to a dynamically-controlled automatic turn signal cancellation in a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A vehicle is equipped with a turn signal indicator that can be activated by a driver to activate turn signaling on the vehicle to provide a visual indication of intention of the driver. The driver can manually cancel a turn signal activation, but the vehicle is also equipped with an automatic turn signal cancellation system configured to automatically cancel previously-activated turn signaling (e.g., activated through a turn signal stalk) in response to detecting a vehicle turn is completed. In response to activation of a turn signal, an automatic turn signal cancellation system can be configured to determine if the turn is completed, to in turn cancel the turn signal based on changes in steering wheel angle. However, it may be difficult for an automatic turn signal cancellation system to distinguish between a normal turn and a highway lane change for controlling the cancellation of a turn signal. For example, at higher vehicle speeds, the steering wheel angle may not change as significantly in a highway lane change as in a normal turn or highway exit. Thus, it may be difficult for an automatic turn signal cancellation system to recognize the difference between a normal turn, a highway lane change, or exit, based on steering wheel angle.

SUMMARY

Exemplary aspects disclosed herein include a dynamically-controlled automatic turn signal cancellation in a vehicle. A vehicle is equipped with a turn signal indicator that can be activated by a driver to activate turn signaling on the vehicle to provide a visual indication of intention of the driver. The driver can manually cancel a turn signal activation, but the vehicle is also equipped with an automatic turn signal cancellation system configured to automatically cancel previously-activated turn signaling (e.g., activated through a turn signal stalk) in response to detecting a vehicle turn is completed. In response to activation of a turn signal, the automatic turn signal cancellation system is configured to determine if the steering wheel angle changes beyond a first threshold angle as an indication the vehicle has turned sufficiently in the direction of turn signal to signify a turn. The automatic turn signal cancellation system is then configured to determine when the steering wheel angle has fallen below a second threshold angle indicating that the turn has reached the maximum steering wheel angle and the steering wheel angle is now returning towards a turn neutral position. If thereafter, the steering wheel angle remains within a turn neutral angle window (e.g., +/−1 radians from a steering wheel turn neutral position) for a determined stability time, meaning the steering wheel angle is now stable after the turn, the turn is deemed completed and the turn signal is automatically cancelled.

In exemplary aspects, the stability time is dynamically determined inversely related to the maximum steering wheel angle of the turn. In other words, the larger the steering wheel motion of the turn, the smaller the stability time used to determine steering wheel stability and turn completion will be. This is because a steering wheel will generally return to a stable position after turn completion in a shorter period of time (e.g., <=1.6 seconds) when recovering from a larger steering wheel motion from a sharper turn (i.e., the steering wheel angle recovery has a larger slope) than from a smaller steering wheel motion from a lighter turn (e.g., <=3 seconds) (i.e., the steering wheel angle recovery has a smaller slope). Vehicles are designed to require more steering wheel force for sharp turns for stability and safety, which then causes the steering wheel to recover to a turn neutral position more quickly for sharp turns as opposed to light turns.

In other exemplary aspects, the automatic turn signal cancellation system can also be configured to dynamically set the first threshold angle that was used to indicate the vehicle had turned sufficiently in the direction of turn signal, based on the speed of the vehicle. This is because the steering wheel angle change needed to perform a given turn is inversely related to vehicle speed, due to increased centripetal force and inertia of a vehicle turn at higher speeds. In other words, the faster the vehicle speed, the less steering wheel angle change is required to perform the desired turn. Thus, in this example, in response to a turn signal being activated, the speed of the vehicle can also be determined. The vehicle speed can then be used to dynamically calculate and set the first threshold angle used to indicate the vehicle has turned sufficiently in the direction of the turn signal. The higher the vehicle speed, the less change in steering wheel angle is required to accomplish a desired turn. Thus, the automatic turn signal cancellation system, determining the vehicle has a higher speed in response to a turn signal activation, will cause the automatic turn signal cancellation system to use a smaller angle as the first threshold angle used to indicate the vehicle has turned sufficiently in the direction of the turn signal than if the vehicle had a slower speed. In this manner, the stability time to determine if the turn signal should be cancelled will inherently be dynamically based on the maximum steering wheel angle of the turn that affects the slope of the steering wheel angle falling back below the second threshold angle. Thus, a larger steering wheel angle slope means a sharper turn at less speed and thus less stability time provided, and a smaller steering wheel angle slope means a lighter turn at higher speed, and more stability time provided.

In yet other exemplary aspects, the ability of the automatic turn signal cancellation system can also be configured to distinguish between a simple turn (e.g., a simple turn and/or roundabout), as compared to highway turning for automatic turn signal cancellation. Highway turning is turning that does not necessarily involve sharp steering wheel angle changes, such as when a vehicle performs highway merging to enter a highway, highway lane changes, and highway exiting. This is because less steering wheel angle change is required to perform a turn at higher speeds than are generally present in highway driving. This is because the steering wheel angle change needed to perform a given turn is inversely related to vehicle speed due to increased centripetal force and inertia of a vehicle turn at higher speeds. Thus, in highway turning, the detection of the steering wheel angle used for detection of simple turns and/or roundabouts may not be significant enough to detect highway turning for automatic turn signal cancellation after the highway turn is completed. Thus, in exemplary aspects, to be able to cancel a turn signal after completion of a highway turn that is not detectable through steering wheel angle change based on exceeding the first threshold angle (e.g., a dynamically set first threshold angle based on vehicle speed), the automatic turn signal cancellation system can be configured to cancel the turn signal based on detecting the highway turn using a secondary turn detection system, such as a forward-looking camera (FLC) that can be used to detect a highway turn. Other secondary turn detection systems of detecting a highway turn may be employed, such as through use of radar, lidar, beacons, global positioning, etc.

According to a first aspect of the disclosure, an automatic turn signal cancellation system comprising processing circuitry configured to, in response to activation of a turn signal in a vehicle is provided. The processing circuitry is configured detect a steering wheel angle related to turning of a steering wheel of the vehicle exceeding a first threshold angle from a turn neutral position indicating a turn. In response to detecting the steering wheel exceeding the first threshold angle, the processing circuitry is further configured to detect that the steering wheel angle has fallen below a second threshold angle less than the first threshold angle and towards the turn neutral position, and determine a maximum steering wheel angle related to turning of the steering wheel after the steering wheel angle exceeded the first threshold angle. In response to detecting that the steering wheel angle has fallen below the second threshold angle, the processing circuitry is further configured to set a stability time based on the determined maximum steering wheel angle, and determine whether the steering wheel angle remains in a turn neutral angle window for the set stability time. In response to determining the steering wheel angle remains in the turn neutral angle window for the set stability time, the processing circuitry is further configured to cancel the turn signal.

Optionally in some examples, including in at least one preferred example, the processing circuitry is further configured to, in response to determining the steering wheel angle does not remain in the turn neutral angle window for the set stability time, not cancel the turn signal.

Optionally in some examples, including in at least one preferred example, the processing circuitry is configured to set the stability time inversely to the determined maximum steering wheel angle.

Optionally in some examples, including in at least one preferred example, the processing circuitry is configured to set the stability time to less than or equal to three (3) seconds and greater than two (2) seconds based on the determined maximum steering wheel angle.

Optionally in some examples, including in at least one preferred example, the processing circuitry is configured to set the stability time to the less than or equal to three (3) seconds and greater than two (2) seconds based on the determined maximum steering wheel angle being less than +/−0.17 radians.

Optionally in some examples, including in at least one preferred example, the processing circuitry is configured to set the stability time to less than or equal to two (2) seconds and greater than 1.6 seconds based on the determined maximum steering wheel angle.

Optionally in some examples, including in at least one preferred example, the processing circuitry is configured to set the determined stability time to the less than or equal to two (2) seconds and greater than 1.6 seconds based on the determined maximum steering wheel angle being greater than or equal to +/−0.17 radians and less than +/−0.19 radians.

Optionally in some examples, including in at least one preferred example, the processing circuitry is configured to set the stability time to less than or equal to 1.6 seconds, based on the determined maximum steering wheel angle.

Optionally in some examples, including in at least one preferred example, the processing circuitry is configured to set the determined stability time to the less than or equal to 1.6 seconds based on the determined maximum steering wheel angle being greater than or equal to +/−0.19 radians.

Optionally in some examples, including in at least one preferred example, the processing circuitry is further configured to, in response to activation of the turn signal in the vehicle: determine a speed of the vehicle, and set the first threshold angle relative to the turn neutral position based on the speed of the vehicle.

Optionally in some examples, including in at least one preferred example, the processing circuitry is configured to set the first threshold angle relative to the turn neutral position of the steering wheel inversely to the speed of the vehicle.

Optionally in some examples, including in at least one preferred example, the processing circuitry is configured to detect the steering wheel angle exceeding the first threshold angle in the direction of the turn signal, and in response to detecting the steering wheel angle exceeding the first threshold angle in the direction of the turn signal: detect that the steering wheel angle has fallen below the second threshold angle less than the first threshold angle towards the turn neutral position, and in response to detecting that the steering wheel angle has fallen below the second threshold angle: determine the maximum steering wheel angle after the steering wheel angle exceeded the first threshold angle; set the stability time based on the determined maximum steering wheel angle; determine whether the steering wheel angle remains in the turn neutral angle window for the set stability time; and in response to determining the steering wheel angle remains in the turn neutral angle window for the set stability time, cancel the turn signal.

Optionally in some examples, including in at least one preferred example, the processing circuitry is configured to, in response to the first threshold angle being set to less than or equal to +/−0.0553 radians, set the determined stability time to less than or equal to 1.5 seconds.

Optionally in some examples, including in at least one preferred example, the turn neutral angle window is between −1 radian and 1 radian.

Optionally in some examples, including in at least one preferred example, in response to activation of the turn signal, the processing circuitry is further configured to: detect a highway turn by the vehicle while the steering wheel angle is within the turn neutral position, and in response to detecting the highway turn, cancel the turn signal.

Optionally in some examples, including in at least one preferred example, the processing circuitry is configured to detect the highway turn by being configured to: receive at least one image from an imaging system, and determine whether the highway turn occurred based on the received at least one image.

Optionally in some examples, including in at least one preferred example, the imaging system comprises a forward-looking camera configured to capture images of a forward-looking perspective from the vehicle.

Optionally in some examples, including in at least one preferred example, the processing circuitry is configured to detect the highway turn by being configured to: receive turn data of the vehicle generated by a global-positioning system (GPS), and determine whether the highway turn occurred based on the received turn data.

Optionally in some examples, including in at least one preferred example, a vehicle comprising the automatic turn signal cancellation system described above is provided.

Optionally in some examples, including in at least one preferred example, the vehicle further comprising a steering wheel angle sensor configured to generate a steering wheel angle signal indicative of the steering wheel angle.

Optionally in some examples, including in at least one preferred example, a method of automatically canceling a turn signal in a vehicle is provided. The method comprises detecting, by a processing circuitry, activation of a turn signal in the vehicle. In response to detecting activation of the turn signal, the method further comprises detecting, by the processing circuitry, a steering wheel angle related to turning of a steering wheel of the vehicle exceeding a first threshold angle from a turn neutral position indicating a turn. In response to the processing circuitry detecting the steering wheel angle exceeding the first threshold angle, the method further comprises detecting, by the processing circuitry, that the steering wheel angle has fallen below a second threshold angle less than the first threshold angle and towards the turn neutral position, and determining, by the processing circuitry, a maximum steering wheel angle related to turning of the steering wheel after the steering wheel angle exceeded the first threshold angle. In response to the processing circuitry detecting that the steering wheel angle has fallen below the second threshold angle, the method further comprises setting, by the processing circuitry, a stability time based on the determined maximum steering wheel angle, determining, by the processing circuitry, whether the steering wheel angle remains in a turn neutral angle window for the set stability time, and canceling, by the processing circuitry, the turn signal in response to determining the steering wheel angle remains in the turn neutral angle window for the set stability time.

Optionally in some examples, including in at least one preferred example, the method further comprises, in response to activation of the turn signal in the vehicle: determining a speed of the vehicle, and setting the first threshold angle relative to the turn neutral position based on the speed of the vehicle.

Optionally in some examples, including in at least one preferred example, a computer program product comprising program code for performing, when executed by the processing circuitry, the method(s) described above.

Optionally in some examples, including in at least one preferred example, a non-transitory computer-readable storage medium comprising instructions, which, when executed by the processing circuitry, cause the processing circuitry to perform the method(s) described above.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

Figure 1:
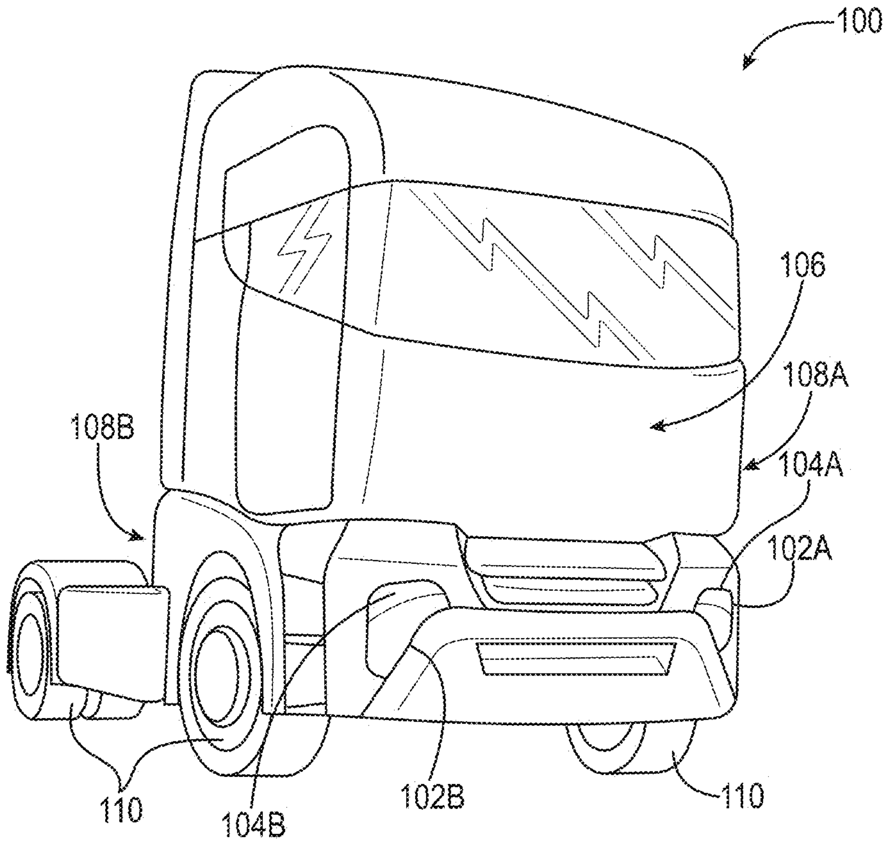
FIG. 1 is a side perspective view of an exemplary vehicle in the form of a truck that has turn signals configured to be manually activated by a turn signal activator (e.g., a turn signal stalk), and wherein the vehicle also has an automatic turn signal cancellation system configured to automatically cancel a turn signal based on detecting a completed turn.

The detailed description set forth below provides information and examples of the disclosed technology with sufficient detail to enable those skilled in the art to practice the disclosure.

Exemplary aspects disclosed herein include a dynamically-controlled automatic turn signal cancellation in a vehicle. A vehicle is equipped with a turn signal indicator that can be activated by a driver to activate turn signaling on the vehicle to provide a visual indication of intention of the driver. The driver can manually cancel a turn signal activation, but the vehicle is also equipped with an automatic turn signal cancellation system configured to automatically cancel previously-activated turn signaling (e.g., activated through a turn signal stalk) in response to detecting a vehicle turn is completed. In response to activation of a turn signal, the automatic turn signal cancellation system is configured to determine if the steering wheel angle changes beyond a first threshold angle as an indication the vehicle has turned sufficiently in the direction of turn signal to signify a turn. The automatic turn signal cancellation system is then configured to determine when the steering wheel angle has fallen below a second threshold angle indicating that the turn has reached the maximum steering wheel angle and the steering wheel angle is now returning towards a turn neutral position. If thereafter, the steering wheel angle remains within a turn neutral angle window (e.g., +/−1 radians from a steering wheel turn neutral position) for a determined stability time meaning the steering wheel angle is now stable after the turn, the turn is deemed completed and the turn signal is automatically cancelled.

In exemplary aspects, the stability time is dynamically determined inversely related to the maximum steering wheel angle of the turn. In other words, the larger the steering wheel motion of the turn, the smaller the stability time used to determine steering wheel stability and turn completion will be. This is because a steering wheel will generally return to a stable position after turn completion in a shorter period of time (e.g., <=1.6 seconds) when recovering from a larger steering wheel motion from a sharper turn (i.e., the steering wheel angle recovery has a larger slope) than from a smaller steering wheel motion from a lighter turn (e.g., <=3 seconds) (i.e., the steering wheel angle recovery has a smaller slope). Vehicles are designed to require more steering wheel force for sharp turns for stability and safety, which then causes the steering wheel to recover to a turn neutral position more quickly for sharp turns as opposed to light turns.

In other exemplary aspects, the automatic turn signal cancellation system can also be configured to dynamically set the first threshold angle that was used to indicate the vehicle had turned sufficiently in the direction of turn signal, based on the speed of the vehicle. This is because the steering wheel angle change needed to perform a given turn is inversely related to vehicle speed, due to increased centripetal force and inertia of a vehicle turn at higher speeds. In other words, the faster the vehicle speed, the less steering wheel angle change is required to perform the desired turn. Thus, in this example, in response to a turn signal being activated, the speed of the vehicle can also be determined. The vehicle speed can then be used to dynamically calculate and set the first threshold angle used to indicate the vehicle has turned sufficiently in the direction of the turn signal. The higher the vehicle speed, the less change in steering wheel angle is required to accomplish a desired turn. Thus, the automatic turn signal cancellation system determining the vehicle has a higher speed in response to a turn signal activation will cause the automatic turn signal cancellation system to use a smaller angle as the first threshold angle used to indicate the vehicle has turned sufficiently in the direction of the turn signal than if the vehicle had a slower speed. In this manner, the stability time to determine if the turn signal should be cancelled will inherently be dynamically based on the maximum steering wheel angle of the turn that affects the slope of the steering wheel angle falling back below the second threshold angle. Thus, a larger steering wheel angle slope means a sharper turn at less speed and thus less stability time provided, and a smaller steering wheel angle slope means a lighter turn at higher speed, and more stability time provided.

In this regard, FIG. 1 is a side perspective view of an exemplary vehicle 100 in the form of a truck that has front head lights 102A, 102B that include respective front left and front right turn signals 104A, 104B configured to be manually activated by a turn signal activator 106 (e.g., a turn signal stalk) to flash to indicate an intention of the driver to turn the vehicle 100. The vehicle 100 also has rear left and right turn signals 108A, 108B located in the rear of the vehicle 100 that are also configured to flash when the turn signal activator 106 is activated. When the turn signal activator 106 is activated for a left turn, the front and rear left turn signals 104A, 108A are activated to flash. When the turn signal activator 106 is activated for a right turn, the front and rear right turn signals 104B, 108B are activated to flash. The vehicle 100 may have other turn signals as well. The vehicle 100 also includes wheels 110 with tires that support the vehicle 100 on the road and are linked to axles that are controlled by a steering wheel (see FIG. 2) inside the vehicle 100 for the driver to turn the vehicle in the desired direction.

Figure 2:
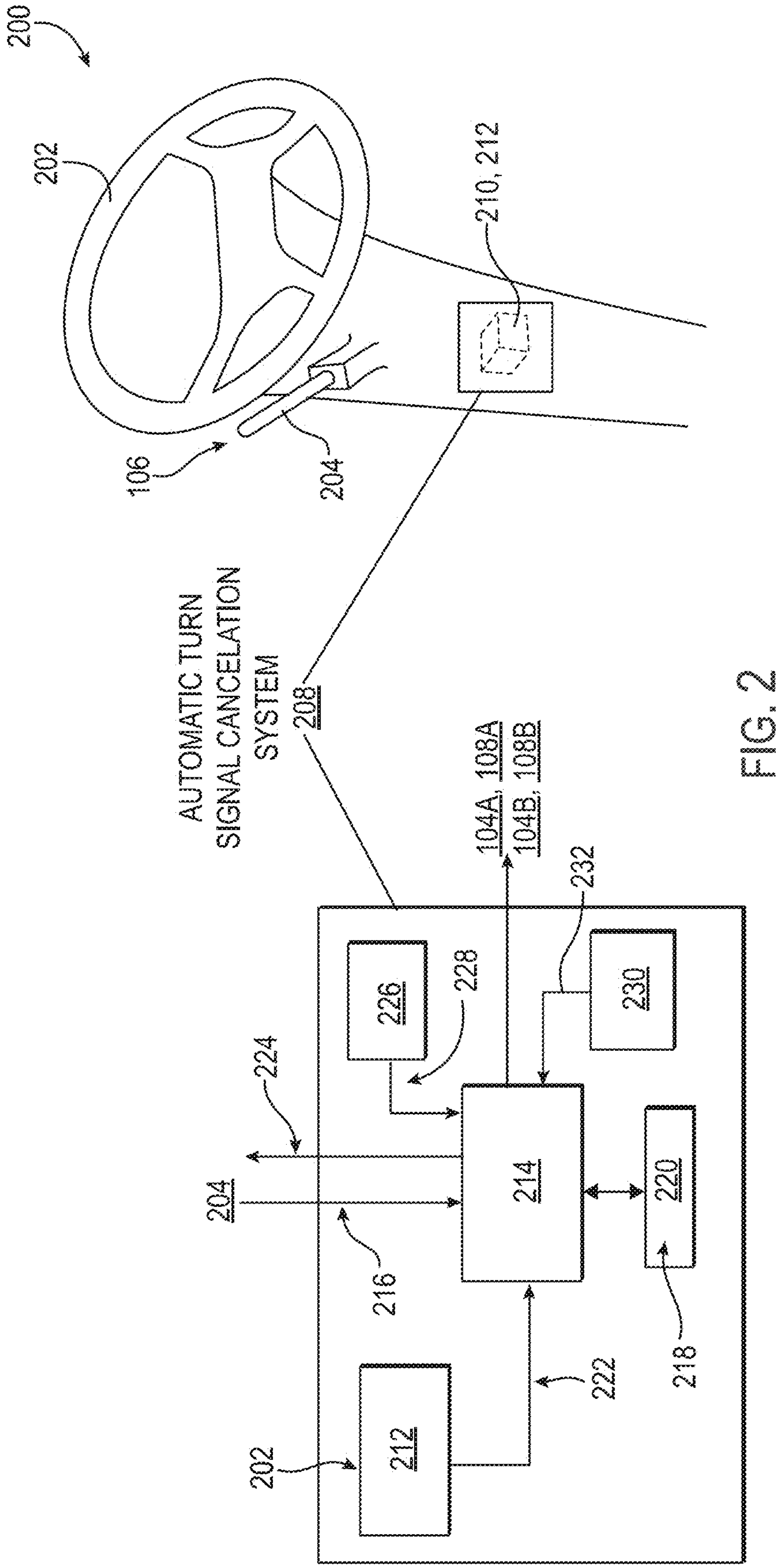
FIG. 2 is a side perspective view of an exemplary steering system that can be in the vehicle in FIG. 1, wherein the steering system includes a steering wheel and a turn signal stalk for activation of a turn signal, and a dynamically-controlled automatic turn signal cancellation system that is coupled to the steering wheel and includes a rotation sensor in the exemplary form of a steering wheel angle sensor configured to detect the turn angle of the steering wheel relative to a turn neutral position used to detect a vehicle turn and completion of a turn and for cancellation of a turn signal.
Figure 3:
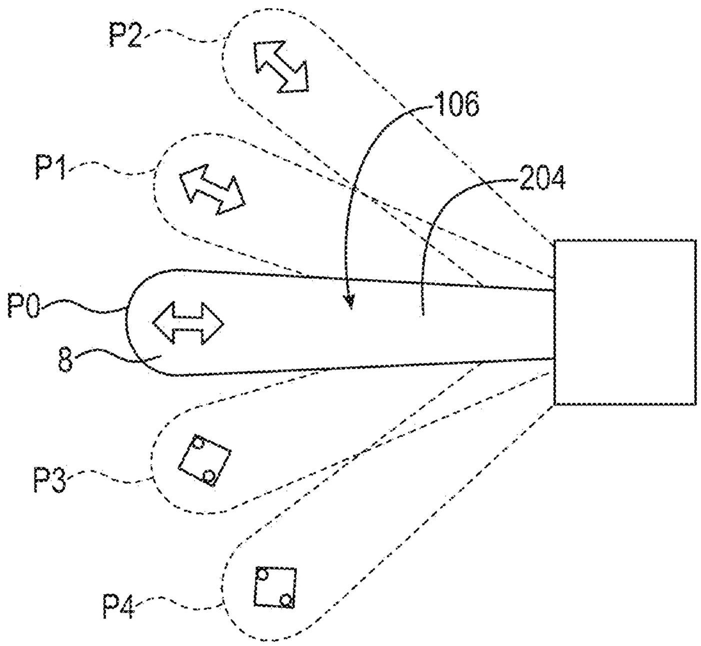
FIG. 3 is a side view of exemplary switch positions of the turn signal stalk in FIG. 2.

FIG. 2 is a side perspective view of an exemplary steering system 200 that can be in the vehicle 100 in FIG. 1 that includes a steering wheel 202 that can be controlled by a driver to steer and turn the vehicle 100. The steering system 200 also includes the turn signal activator 106 in the form of a turn signal stalk 204 in this example for activation of the turn signals 104A, 108A and 104B, 108B. However, other forms of a turn signal activator 106, such as a turn signal button integrated into the steering wheel 202, could also be provided. In this example, as shown in FIG. 3, to activate the left turn signals 104A, 108A, the turn signal stalk 204 is rotated downward from a P0 turn neutral position, which is also a turn signal deactivation position, to position P4. Position P0 of the turn signal stalk 204 is referred to as "stable" or turn neutral position because it is a position in which the turn signal stalk 204 is located by default, in the absence of any action by the driver. On the other hand, all other positions P1 to P4 are referred to as "unstable" positions since the turn signal stalk 204 cannot remain locked (alone) in any of these positions. The driver of the vehicle 100 moves the turn signal stalk 204 up when he wishes to turn right and moves the turn signal stalk 204 down when he wishes to turn left. To activate the right turn signals 104B, 108B, the turn signal stalk 204 is rotated upward to the P2 position. In this example, to momentarily activate either the left turn signals 104A, 108A, or right turn signals 104B, 108B, the turn signal stalk 204 can be moved to the positions P3 and P1, respectively, which are also referred to as "highway positions" to signify lane changes or merging entrances and exits, for example. In positions P3 and P1, the turn signal stalk 204 is configured to automatically return to position P0 when force is removed from the turn signal stalk 204. The steering system 200 in the vehicle 100 may be configured to cause the left turn signals 104A, 108A and right turn signals 104B, 108B to flash for only a predetermined or programmed limited number of times or duration of time with the turn signal stalk 204 is moved to the respective positions P3 and P1. This is particularly suitable for driving on highways, where changes of direction are generally very short. In this instance, turn signal cancellation is not required. Advantageously, if the driver keeps the turn signal stalk 204 in its first position P1 or P3, i.e., if he does not let the turn signal stalk 204 return to its neutral position P0, then the right turn signals 104B, 108B or left turn signals 104A, 108A remain activated until the turn signal stalk 204 returns to its neutral position P0.

The angle of movement required to move the turn signal stalk 204 between the neutral position P0 and the second position P2 or P4 is greater than that required to move the turn signal stalk 204 between the neutral position P0 and the first position P1 or P3. When the turn signal stalk 204 is set to either position P2 or P4 in this example, the turn signal stalk 204 could be designed to release back to neutral position P0 with the respective right turn signals 108BA, 108B or left turn signals 104A, 108A remaining active until either cancelled manually by the driver or through an automatic turn signal cancellation system like described below. Alternatively, when the turn signal stalk 204 is set to either position P2 or P4, the turn signal stalk 204 could be designed to remain in these positions and the respective right turn signals 108BA, 108B or left turn signals 104A, 108A remain active until the turn signal stalk 204 is moved out of these positions P2 or P4 back to the neutral position P0 either manually or through an automatic turn signal cancellation system like described below. This type of actuation mode is discussed in U.S. Pat. No. 9,041,526 B2, which is incorporated herein by reference in its entirety. Thus, right turn signals 104B, 108B or left turn signals 104A, 108A could remain active and continue to flash until either manually canceled or automatically canceled by an automatic turn signal cancellation system. For example, a driver may move the turn signal stalk 204 from position P2 or P4 to neutral position P0, or the driver may move the turn signal stalk 204 from position P2 or P4 all the way to respective positions P4 or P2 to signify a right turn then going directly to a left turn. Finally, the turn signals 104A, 108A or 104B, 108B automatically turn off when the driver of the vehicle 100 switches off its ignition, i.e., turns off the engine.

As mentioned above, and as shown in FIG. 2, the steering system 200 of the vehicle 100 in this example also includes a dynamically-controlled automatic turn signal cancellation system 208 to automatically deactivate the vehicle's 100 turn signals 104A, 108A or 104B, 108B at the end of a turn. The dynamically-controlled automatic turn signal cancellation system 208 could be part of the vehicle's 100 Electronic Control Unit (ECU). In this example, as shown in FIG. 2, the dynamically-controlled automatic turn signal cancellation system 208 includes a steering wheel sensor 210 in the form of a steering wheel angle sensor 212 (also referred to as a steering angle sensor (SAS)) configured to measure the rotation of the steering wheel 202, and in particular the angle of the steering wheel 202 with respect to a turn neutral position in which the vehicle wheels 110 are generally straight. The steering wheel angle sensor 212 can measure the degree of rotation of the steering wheel 202 in relation to a turn neutral position. Of course, any other sensor or method can be used to determine the degree of rotation of the steering wheel in radiant/degrees. Typically, steering wheel angle information can be accessed from the power steering system data of the vehicle 100. The angle of the steering wheel 202 is a relative angle which can therefore be positive or negative depending on the direction of rotation from a turn neutral position. Typically, when talking about the steering wheel 202 angle in relation to a turn neutral position (wheels straight), the steering wheel 202 angle will be positive when turning the steering wheel 202 to the left and negative when turning the steering wheel 202 to the right (polar coordinates). The same applies to the average angle of the vehicle's front wheels 110. When turning left, the angle of rotation of the wheels 110 is considered positive, while when turning right, it will be negative. This dynamically-controlled automatic turn signal cancellation system 208 is configured to control the activation and deactivation of the turn signals 104A, 108A or 104B, 108B according to the driver's maneuvers on the turn signal stalk 204 and the vehicle's driving conditions, as described in more detail below.

Figure 4:
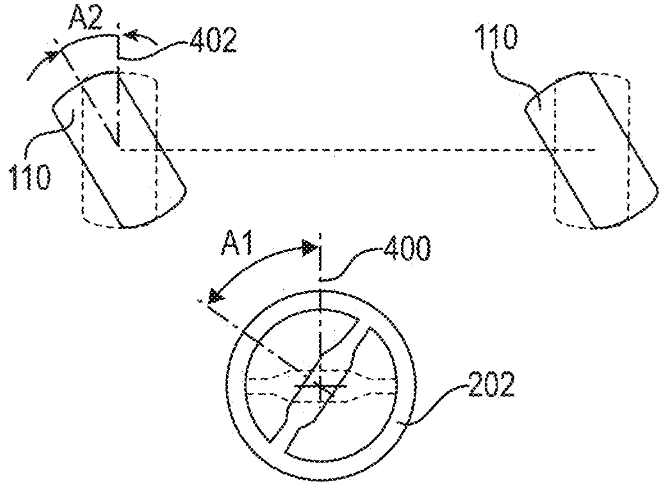
FIG. 4 is a diagram illustrating an exemplary vehicle turn angle as a function of change in the steering wheel angle by the turning of the steering wheel in FIG. 2.

FIG. 4 is a diagram illustrating an exemplary vehicle turn angle that can be sensed by the steering wheel angle sensor 212 as a function of change in the steering wheel 202 angle by the turning of the steering wheel 202 in FIG. 2. For example, as shown in FIG. 4, when the steering wheel 202 is turned left from a turn neutral position 400 of the steering wheel 202 to the left at steering wheel angle A1, the vehicle 100 is configured to turn the front wheels 110 from a turn neutral position to a wheel steering angle A2, which can also be referred to a steering wheel angle A2. In other words, the turning of the steering wheel 202 causes the front wheels 110 to move in the same direction, but such movement may not be linear. The steering wheel angle sensor 212 in FIG. 2 is configured to detect the steering wheel angle A1 movement of the steering wheel 202 from the turn neutral position 400 of the steering wheel 202. The steering wheel angle A2 is known as average wheel angle, because there may be a slight difference between the right and left wheel 110 angles. The steering wheel angle A2 of the vehicle's steered wheels' radians with respect to their upright position may be extrapolated based on the steering wheel angle A1 from a model previously established from several wheels angle calculations for several specific steering wheel angles. In particular, the relationship has been advantageously linearized through five (5) wheel steering angle values for which the ratio between steering wheel angle A1 and average steering wheel angle A2 is known. The parameters that influence the steering of the vehicle 100 and the angle of turning of the wheels 110 as a function of the turning of the steering wheel 202 are essentially as follows: vehicle type (length, weight, etc.), engine (dimensions), chassis, wheelbase, connection bar, front suspension, number of axles, and directional geometry, etc.

Five known exemplary steering ratios are as follows:

Steering ratio when the average wheel angle is 0.6 radians on the right;

Steering ratio when the average wheel angle is 0.2 radians on the right;

Steering ratio when the average wheel angle is 0 radians;

Steering ratio when the average wheel angle is 0.2 radians left;

Steering ratio when the average wheel angle is 0.6 radians to the left.

From these values, it is possible to estimate, for a given steering wheel angle A1 value, the average angle of the corresponding wheels with some precision as described in International Patent Application Publication WO 2020/173543, incorporated herein by reference.

Note that as examples, the dynamically-controlled automatic turn signal cancellation system 208 can be configured to use the steering wheel angle A1 or a translation of the steering wheel angle A1 to the wheel angle A2 to perform tasks relating to detection and completion of a turn discussed herein. The term "steering wheel angle" is used to encompass either steering wheel angle A1 or wheel angle A2.

Figure 5:
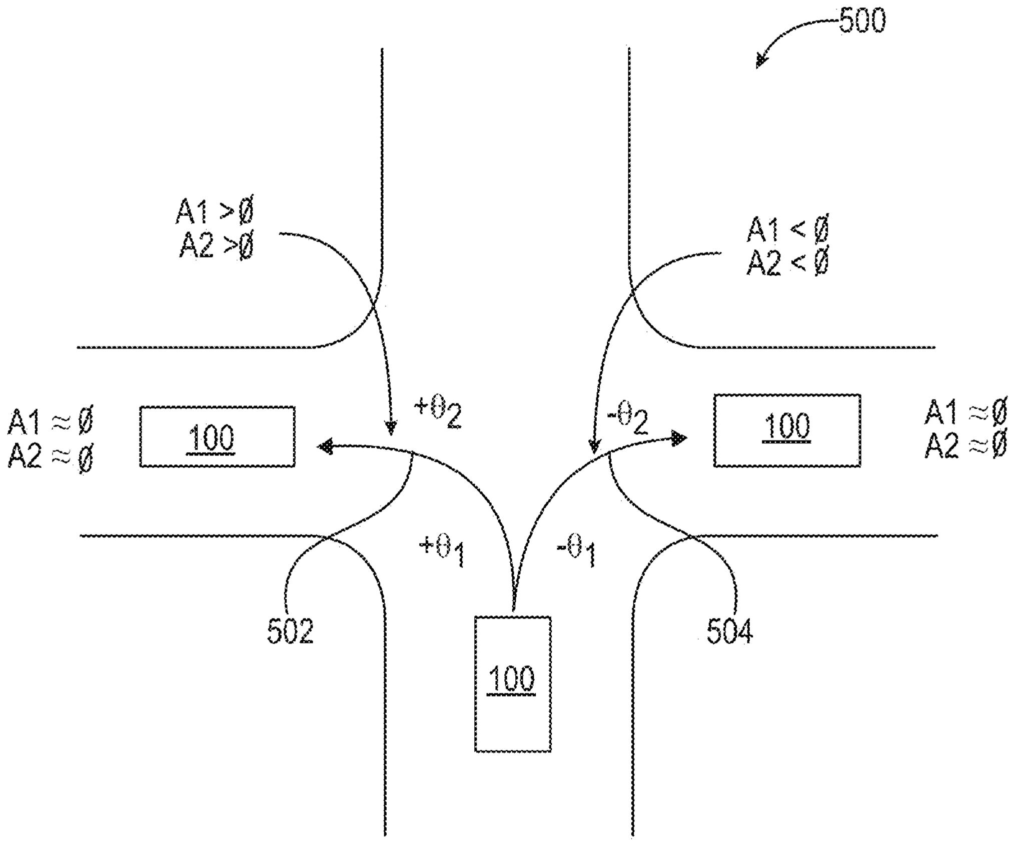
FIG. 5 is an exemplary road intersection to illustrate turning.

The dynamically-controlled automatic turn signal cancellation system 208 in FIG. 2 can be used to cancel a turn signal 104A, 108A or 104B, 108B that has been activated based on detecting a turn of the vehicle 100 using the steering wheel angle sensor 212 and its completion. For example, FIG. 5 illustrates an exemplary road intersection 500 to illustrate a vehicle 100 turn and automatic cancellation of a turn signal 104A, 108A or 104B, 108B by the dynamically-controlled automatic turn signal cancellation system 208 in FIG. 2. Processing circuitry 214 of the dynamically-controlled automatic turn signal cancellation system 208 is configured to receive a turn signal indicator 216 indicating activation of a turn signal 104A, 108A or 104B, 108B. The processing circuitry 214 could be a microprocessor or other central processing unit (CPU) that is configured to execute computer instructions (e.g., software, firmware) to perform tasks. For example, computer instructions 218 could be stored in a memory 220 accessible by the processing circuitry 214 as shown in FIG. 2. The processing circuitry 214 could also be circuitry that does not execute software or computer instructions, but includes logic circuitry that is configured to perform tasks, such as a field programmable gate array (FPGA), or other logic circuitry (e.g., logic gates, flip-flops, and/or data buffer circuits, etc.).

In response to activation of a turn signal 104A, 108A or 104B, 108B by activation of the turn signal stalk 204 to a permanent turn signal position P2 or P4 by a driver, the processing circuitry 214 in the dynamically-controlled automatic turn signal cancellation system 208 is configured to determine the average steering wheel angle A2 based on the determined steering wheel angle A1 based on steering wheel angle data 222 from the steering wheel angle sensor 212 like shown in FIG. 4. The steering wheel angle data 222 is data indicative of the steering wheel angle A1 detected by the steering wheel angle sensor 212. The processing circuitry 214 is configured to detect the turn based on the steering wheel angle data 222. FIG. 5 is an exemplary road intersection 500 that illustrates a left turn 502 and right turn 504 by the vehicle 100. Before the turn, because the steering wheel 202 is at or approximately at the turn neutral position 400 as shown in FIG. 4, the steering wheel angle A1 is approximately zero (0) in a turn neutral position, and thus the steering wheel angle A2 is also approximately zero (0) in a turn neutral position. The steering wheel angle A1 is measured continuously by the processing circuitry 214 using the steering wheel angle data 222 in response to the vehicle 100 driver manually activating one of the turn signals 104A, 108A or 104B, 108B. The steering wheel angle A1 is measured by the processing circuitry 214 with respect to the turn neutral position 400. The average steering wheel angle A2 is compared to a first threshold angle Θ1, −Θ1 by the processing circuitry 214 to detect that the vehicle 100 has really started a respective left turn 502 or right turn 504 by determining whether the driver has turned the steering wheel 202 sufficiently in the direction of the turn. The first threshold angle Θ1, −Θ1 is positive for the left turn 502 and negative for the right turn 504. The first threshold angle Θ1, −Θ1 may be stored in a memory 220 accessible by the processing circuitry 214, and may be configured to be a fixed setting or programmable.

Then, after the left turn 502 or right turn 504 has been detected, the processing circuitry 214 of the dynamically-controlled automatic turn signal cancellation system 208 determines whether the average steering wheel angle A2 has fallen below a respective second threshold angle +Θ2, −Θ2. The second threshold angle is positive for the left turn 502 and negative for the right turn 504. The second threshold angle +Θ2, −Θ2 may also be stored in the memory 220 accessible by the processing circuitry 214, and may be configured to be a fixed setting or programmable. Once the processing circuitry 214 of the dynamically-controlled automatic turn signal cancellation system 208 determines the average steering wheel angle A1 or A2 has fallen below a second threshold angle, the turn 502 or 504 is deemed completed, and the processing circuitry 214 cancels the relevant turn signals 104A, 108A or 104B, 108B. In an alternative, if the turn signal stalk 204 is designed to remain in a turn signal position after moved to position P2 or P4, the processing circuitry 214 could also be configured to issue a release command 224 to automatically return or release the turn signal stalk 204 to neutral position P0 to cancel the turn signals 104A, 108A or 104B, 108B. After the turn 502 or 504 is completed, the steering wheel angle A1 and the steering wheel angle A2 return to approximately zero (0).

Also note that the processing circuitry 214 in the dynamically-controlled automatic turn signal cancellation system 208 in FIG. 2 can also be configured to interface with a speedometer 226 or other speed measurement device to receive the current speed 228 of the vehicle 100. As discussed in more detail below, the processing circuitry 214 may be configured to use the speed of the vehicle 100 as part of the automatic turn signal cancellation. Also note that the processing circuitry 214 in the dynamically-controlled automatic turn signal cancellation system 208 in FIG. 2 can also be configured to interface with a secondary turn data system 230, such as a camera, video camera, radar device, lidar device, a global positioning system (GPS) device, etc., to provide secondary turn data 232 relating to the vehicle 100. For example, the secondary turn data 232 may be forward-looking images from a camera imaged in a direction pointed away from a given side of the vehicle 100. As also discussed in more detail below, the processing circuitry 214 may be configured to use the secondary turn data 232 as part of the automatic turn signal cancellation.

It may be difficult for the dynamically-controlled automatic turn signal cancellation system 208 in FIG. 2 to distinguish between a normal turn (e.g., left turn 502 or right turn 504 in FIG. 5) and a highway lane change for controlling the cancellation of a turn signal 104A, 108A or 104B, 108B. For example, at higher vehicle speeds, the steering wheel angle A1 may not change as significantly in a highway lane change as in a normal turn or highway exit. Thus, it may be difficult for the dynamically-controlled automatic turn signal cancellation system 208 to recognize the difference between a normal turn, a highway lane change, or exit, based on steering wheel angle.

In this regard, the dynamically-controlled automatic turn signal cancellation system 208 in FIG. 2 can be configured to be a dynamically-controlled automatic turn signal cancellation system 208 in the vehicle 100. As discussed in more detail below, in response to activation of a turn signal, the dynamically-controlled automatic turn signal cancellation system 208 can be configured to determine if the steering wheel angle A1 (or steering wheel angle A2) changes beyond the first threshold angle Θ1, −Θ1 as an indication the vehicle 100 has turned sufficiently in the direction of turn signal to signify a turn, as previously discussed. The dynamically-controlled automatic turn signal cancellation system 208 is then configured to determine when the steering wheel angle A1 (or steering wheel angle A2) has fallen below the second threshold angle Θ2, −Θ2 indicating that the vehicle 100 turn has reached the maximum steering wheel angle A1 and the steering wheel angle A1 is now returning towards the turn neutral position 400. If thereafter, the steering wheel angle A1 (or steering wheel angle A2) remains within a turn neutral angle window (e.g., +/−1 radians from the turn neutral position 400) for a determined stability time, meaning the steering wheel angle A1 is now stable after the turn, the turn is deemed completed and the turn signal is automatically cancelled. In exemplary aspects, the stability time is dynamically determined by the dynamically-controlled automatic turn signal cancellation system 208 and its processing circuitry 214, inversely related to a maximum steering wheel angle $A_{MAX}$ of the turn. In other words, the larger the steering wheel 202 motion of the turn, the smaller the stability time will be used by the processing circuitry 214 to determine steering wheel 202 stability and turn completion. This is because a steering wheel 202 will generally return to a stable position after turn completion in a shorter period of time (e.g., <=1.6 seconds) when recovering from a larger steering wheel 202 motion from a sharper turn (i.e., the steering wheel angle A1 recovery has a larger slope) than from a smaller steering wheel 202 motion from a lighter turn (e.g., <=3 seconds) (i.e., the steering wheel angle A1 recovery has a smaller slope). Vehicles are designed to require more steering wheel force for sharp turns for stability and safety, which then causes the steering wheel to recover to a turn neutral position more quickly for sharp turns as opposed to light turns.

Figure 6:
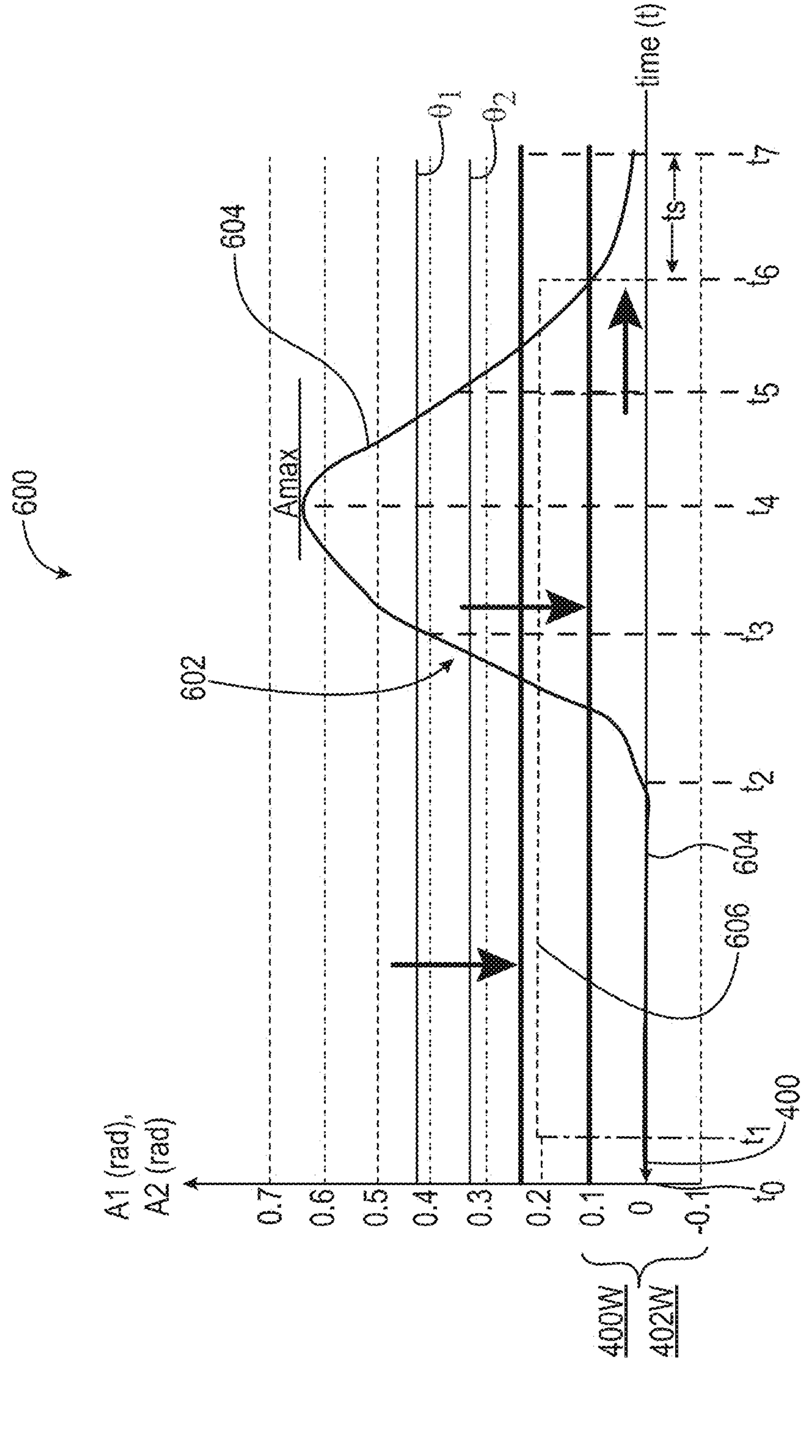
FIG. 6 is a graph illustrating an exemplary steering wheel angle detected by a steering wheel angle sensor in the dynamically-controlled automatic turn signal cancellation system in FIG. 2, wherein the steering wheel angle is used by the processing circuitry to detect a turn and cancel a turn signal based on the steering wheel angle returning and remaining in a turn neutral angle window for a stability time dynamically set according to the determined maximum steering wheel angle of the turn.

In this regard, FIG. 6 is a graph 600 illustrating an exemplary turn 602 as a function based on the steering wheel angle A1 or A2 as function of time (t) used to discuss the ability of the dynamically-controlled automatic turn signal cancellation system 208 in FIG. 2 to detect the turn 602 and dynamically set a stability time for determining if an activated turn signal 104A, 108A or 104B, 108B for the turn 602 should be automatically cancelled. Using the example of FIG. 6, the dynamically-controlled automatic turn signal cancellation system 208 is configured to dynamically set the stability time based on determining a maximum steering wheel angle $A_{MAX}$ of the turn 602 after detecting the turn 602 using the steering wheel angle A1 or A2 as compared to the first threshold angle Θ1, −Θ1, like described above, and detecting a start to completion of the turn using the steering wheel angle A1 or A2 as compared to the second threshold angle Θ2, −Θ2, also like described above. The dynamically set stability time is then used to determine if the steering wheel angle A1 or A2 thereafter remains in a turn neutral position 400 or 402, which in this example is a turn neutral angle window 400W or 402W (e.g., +/−1 radians from the turn neutral position 400 or 402) to determine if the turn is completed and the turn signal 104A, 108A or 104B, 108B should be automatically cancelled. In this example, the turn neutral angle window 400W is used if the steering wheel angle A1 is used to detect the turn 602, and the turn neutral angle window 402W is used if the steering wheel angle A2 is used to detect the turn 602.

Figure 7:
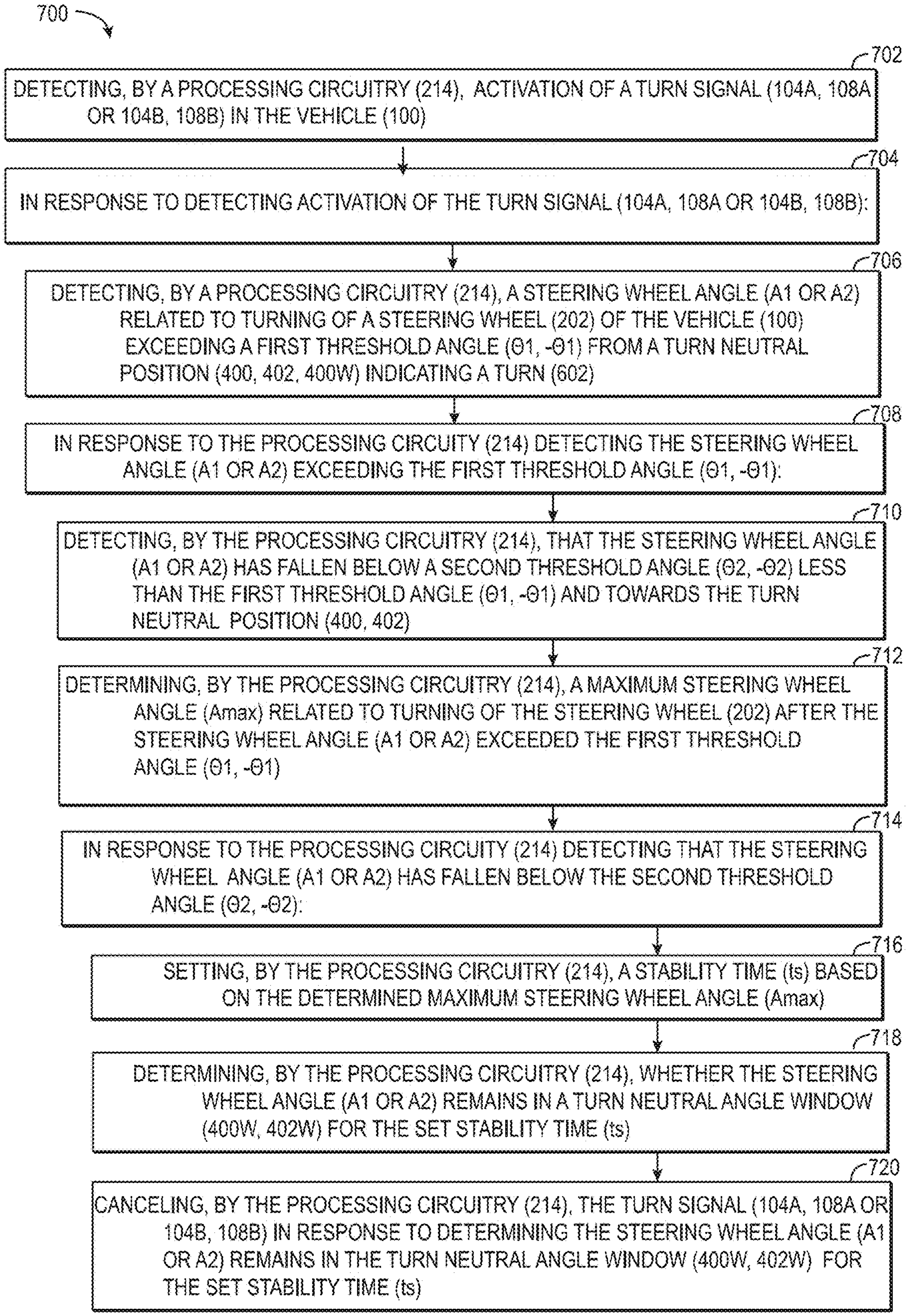
FIG. 7 is a flowchart illustrating an exemplary process of the processing circuitry in the dynamically-controlled automatic turn signal cancellation system in FIG. 2 for automatically canceling a turn signal based on detecting a turn that has been completed as a function of the steering wheel angle remaining within a turn neutral angle window for a determined stability time, wherein the stability time is dynamically set according to the determined maximum steering wheel angle of the turn.

FIG. 7 is a flowchart illustrating an exemplary process 700 of the processing circuitry 214 in the dynamically-controlled automatic turn signal cancellation system 208 in FIG. 2 automatically canceling a turn signal 104A, 108A or 104B, 108B based on detecting a turn, like turn 602 in FIG. 6, that has been completed as a function of steering wheel angle A1 or A2 remaining within a turn neutral angle window for the dynamically set stability time according to a determined maximum steering wheel angle $A_{MAX}$ of a vehicle turn. The exemplary process 700 in FIG. 7 is discussed below with reference to the exemplary turn 602 in FIG. 6, but such is not limiting.

In this regard, as illustrated in FIG. 6, at time t0, the steering wheel angle A1 or A2 is zero (0) as indicated by steering angle curve 604 meaning that the steering wheel 202 of the vehicle 100 is located at or approximately at the turn neutral position 400 or 402 (see FIG. 4). This means the vehicle wheels 110 are substantially straight and is not turning at this time. Turn signal curve 606, that is, a dashed box in the form of a square wave in this example, illustrates the state of the turn signals 104A, 108A or 104B, 108B being activated, with a zero (0) value meaning the turn signals 104A, 108A or 104B, 108B are not activated, and a step up meaning turn signals 104A, 108A or 104B, 108B are activated. Then, as shown in FIG. 6, the turn signal activator 106 is activated at time t1 to activate a turn signal 104A, 108A or 104B, 108B. The processing circuitry 214 is configured to detect this activation of the turn signal 104A, 108A or 104B, 108B (e.g., based on the turn signal indicator 216 in FIG. 2) (block 702 in FIG. 7). In response to the activation of the turn signal activator 106 (block 704 in FIG. 7), the processing circuitry 214 is configured to detect the steering wheel angle A1 or A2 related to turning of the steering wheel 202 of the vehicle 100 in the direction of the turn signal 104A, 108A or 104B, 108B. If the processing circuitry 214 does not detect the turn 602 based on the steering wheel angle A1 or A2 in the same direction as the turn signal 104A, 108A or 104B, 108B, the process 700 may be discontinued or another process used to perform automatic turn signal cancellation. Note that at time t2 in the turn 602 in FIG. 6, the steering wheel angle A1 or A2 starts to become positive, meaning that a possible turn is starting by the driver of the vehicle 100 starting the turning the steering wheel 202. In this example in FIG. 6, the turn 602 is a left turn, and thus the first threshold angle Θ1 is a positive angle. However, the processing circuitry 214 does not consider the increase in the steering wheel angle A1 or A2 to be a turn in this example until the steering wheel angle A1 or A2 exceeds the first threshold angle Θ1 at time t3. For example, the first threshold angle Θ1 may be a fixed angle value or may be dynamically set based on the speed of the vehicle 100 at the time the turn signal 104A, 108A or 104B, 108B is activated, as discussed in more detail below with regard to FIG. 7. In the example turn 602 in FIG. 6, the first threshold angle Θ1 is approximately 0.42 radians.

With continuing reference to FIG. 6, the processing circuitry 214 is then configured to detect the steering wheel angle A1 or A2 related to turning of the steering wheel 202 exceeding the first threshold angle Θ1, −Θ1 from a turn neutral position indicating the turn 602 (block 706 in FIG. 7). In this example, the processing circuitry 214 is configured to detect the steering wheel angle A1 or A2 exceeding the first threshold angle Θ1 from a turn neutral angle window 400W or 402W with an angle range (+1/−1 radian in this example) around the turn neutral position 400 or 402.

Thereafter, in response to the processing circuitry 214 detecting the steering wheel angle A1 or A2 exceeding the first threshold angle threshold angle Θ1 (block 708 in FIG. 7), the processing circuitry 214 is configured to detect the steering wheel angle A1 or A2 has fallen below the second threshold angle Θ2 less than the first threshold angle Θ1 and towards the turn neutral position 400, 402 (block 710 in FIG. 7). This is shown at time t5 in FIG. 6. This means that the turn 602 has reached its maximum steering wheel angle $A_{MAX}$, and the steering wheel 202 is starting to be turned back or let recover back towards the turn neutral position 400, 402. The processing circuitry 214 determines the maximum steering wheel angle $A_{MAX}$ of the turn 602 after the steering wheel angle A1 or A2 exceeds the first threshold angle Θ1, which is shown at time t4 in FIG. 6 (block 712 in FIG. 7).

Then, with continuing reference to FIG. 6, after the processing circuitry 214 detects that the steering wheel angle A1 or A2 has fallen below the second threshold angle Θ2 (less than the first threshold angle Θ1) and towards the turn neutral position 400, 402 (block 714 in FIG. 7) such that the maximum steering wheel angle $A_{MAX}$ can be determined (block 712 in FIG. 7), the processing circuitry 214 dynamically sets a stability time ts for the steering wheel angle A1 or A2 based on the determined maximum steering wheel angle $A_{MAX}$ (block 716 in FIG. 7). In this manner, the stability time ts is dynamically determined inversely related to maximum steering wheel angle A1 or A2 of the turn 602. In other words, the larger the steering wheel 202 motion of the turn 602, the smaller the stability time ts used to determine steering wheel 202 stability and turn 602 completion will be. This is because the steering wheel 202 will generally return to a stable position (i.e., turn neutral position 400, 402) after turn completion in a shorter period of time (e.g., <=1.6 seconds) when recovering from a larger steering wheel 202 motion from a sharper turn (i.e., the steering wheel angle A1 or A2 recovery has a larger slope) than from a smaller steering wheel 202 motion from a lighter turn (e.g., <=3 seconds) (i.e., the steering wheel angle A1 or A2 recovery has a smaller slope). Vehicles are designed to require more steering wheel force for sharp turns for stability and safety, which then causes the steering wheel to recover to a turn neutral position more quickly for sharp turns as opposed to light turns. In this manner, by the processing circuitry 214 being configured to dynamically set the stability time ts for the steering wheel angle A1 or A2 based on the determined maximum steering wheel angle $A_{MAX}$ (block 716 in FIG. 7), the processing circuitry 214 can be more accurate in actually determining if and when the turn 602 is actually completed, as opposed to having to use a fixed or preset stability time.

For example, if a fixed or preset stability time that was set to a reduced time to more accurately detect completion of a sharper turn was used, this may be too short of a stability time to detect completion of a lighter turn. Thus, turn signals for a lighter turn may not be automatically cancelled properly or accurately. Similarly, if a fixed stability time was used that was set to an increased time to more accurately detect completion of a lighter turn, this may be too long a stability time to accurately detect when a sharper turn is completed, thus delaying cancellation of the turn signal after the shaper turn is completed.

With continuing reference to FIG. 6, the processing circuitry 214 then determines whether the steering wheel angle A1 or A2 remains in the turn neutral angle window 400W or 402W after entering the turn neutral angle window 400W or 402W at time t6 for at least the set stability time ts (block 718 in FIG. 7). The processing circuitry 214 determines whether the steering wheel angle A1 or A2 remains in the turn neutral angle window 400W or 402W for the stability time ts starting at time t6 when the steering wheel angle A1 or A2 enters back into the turn neutral angle window 400W or 402W after the steering wheel angle A1 or A2 falls below the second threshold angle Θ2. If the processing circuitry 214 determines that the steering wheel angle A1 or A2 remains in the turn neutral angle window 400W or 402W during the set stability time ts, this means that the steering wheel 202 and the vehicle wheels 110 are substantially no longer turning for the stability time ts, thus indicating the turn 602 has completed, and the turn signal 104A, 108A or 104B, 108B is cancelled by the processing circuitry 214 (block 720 in FIG. 7). In this example turn 602 in FIG. 6, the stability time ts extends from time t6 to time t7. As shown in FIG. 6, the steering wheel angle A1 or A2 remains in the turn neutral angle window 400W or 402W during the set stability time ts between time t6 and time t7. If the steering wheel angle A1 or A2 did not remain in the turn neutral angle window 400W or 402W during the set stability time ts between time t6 and time t7, and instead increased outside the turn neutral angle window 400W or 402W, the turn signal 104A, 108A or 104B, 108B would not be cancelled until steering wheel angle A1 or A2 returned inside and remained in turn neutral angle window 400W or 402W for at least the set stability time ts.

In an example, as shown in FIG. 6, the turn neutral angle window 400W or 402W can be +/−1 radian, but could also be a different window size around the turn neutral position 400 or 402. The size of the turn neutral angle window 400W or 402W can be determined based on empirical testing or other data so as to not be too narrow of an angle window for accurately and consistently detecting a turn completion that had actually been completed, but not too wide to prematurely detect a turn completion that was not yet completed.

In another example, the dynamically-controlled automatic turn signal cancellation system 208 and its processing circuitry 214 may be configured to set the stability time ts to three (3) seconds if the maximum steering wheel angle $A_{MAX}$ is determined to be less than +/−0.17 radians, meaning a lighter turn. In another example, the dynamically-controlled automatic turn signal cancellation system 208 and its processing circuitry 214 may be configured to set the stability time ts to 1.6 seconds if the maximum steering wheel angle $A_{MAX}$ is determined to be greater than or equal to +/−0.19 radians, meaning a sharper turn. In another example, the dynamically-controlled automatic turn signal cancellation system 208 and its processing circuitry 214 may be configured to set the stability time ts to two (2) seconds if the maximum steering wheel angle $A_{MAX}$ is determined to be greater than or equal to +/−0.17 radians, but less than +/−0.19 radians, meaning a mid-turn between a lighter turn and sharper turn.

As discussed above, the dynamically-controlled automatic turn signal cancellation system 208 is configured to detect a turn based on the steering wheel angle A1 or A2 exceeding the first threshold angle Θ1, −Θ1. However, the steering wheel angle A1 or A2 change needed to perform a given turn is inversely related to vehicle 100 speed due to increased centripetal force and inertia of a vehicle 100 turn at higher speeds. In other words, the faster the vehicle 100 speed, the less steering wheel angle A1 or A2 change is required to perform the desired turn. Thus, if a fixed or preset first threshold angle Θ1, −Θ1 is used by the dynamically-controlled automatic turn signal cancellation system 208 to detect a turn, such may not always result in an accurate turn detection. For example, if the first threshold angle Θ1, −Θ1 were preset to a fixed higher threshold angle, the steering wheel angle A1 or A2 may not exceed the first threshold angle Θ1, −Θ1 for a turn at a higher vehicle 100 speed. Similarly, if the first threshold angle Θ1, −Θ1 were preset to a fixed lower threshold angle, the steering wheel angle A1 or A2 may exceed the first threshold angle Θ1, −Θ1 for a turn at a lower vehicle 100 speed that is not actually a turn.

Thus, in other exemplary aspects, the dynamically-controlled automatic turn signal cancellation system 208 can also be configured to dynamically set the first threshold angle Θ1, −Θ1 that was used to indicate the vehicle 100 had turned sufficiently in the direction of the turn signal 104A, 108A or 104B, 108B based on the speed of the vehicle 100. This is because the steering wheel angle A1 or A2 change needed to perform a given turn is inversely related to vehicle 100 speed due to increased centripetal force and inertia of a vehicle 100 turn at higher speeds. In other words, the faster a vehicle 100 speed, the less steering wheel angle A1 or A2 change is required to perform the desired turn. Thus, in this example, in response to a turn signal being activated, the speed of the vehicle 100 can also be determined. The speed of the vehicle 100 can then be used to dynamically calculate and set the first threshold angle Θ1, −Θ1 used to indicate the vehicle 100 has turned sufficiently in the direction of turn signal 104A, 108A or 104B, 108B. The higher the speed of the vehicle 100, the less change in steering wheel angle A1 or A2 is required to accomplish a desired turn. Thus, the dynamically-controlled automatic turn signal cancellation system 208 determining the vehicle 100 has a higher speed in response to a turn signal activation will cause the dynamically-controlled automatic turn signal cancellation system 208 to use a smaller angle as the first threshold angle Θ1, −Θ1 used to indicate the vehicle 100 has turned sufficiently in the direction of the turn signal 104A, 108A or 104B, 108B than if the vehicle 100 had a slower speed. In this manner, the stability time to determine if the turn signal 104A, 108A or 104B, 108B should be cancelled will inherently be dynamically based on the maximum steering wheel angle $A_{MAX}$ of the turn that affects the slope of the steering wheel angle A1 or A2 falling back below the second threshold angle Θ2, −Θ2. Thus, a larger steering wheel angle A1 or A2 slope means a sharper turn at a lower speed, and thus less stability time provided, and a smaller steering wheel angle A1 or A2 slope means a lighter turn at a higher speed, and more stability time provided.

Figure 8:
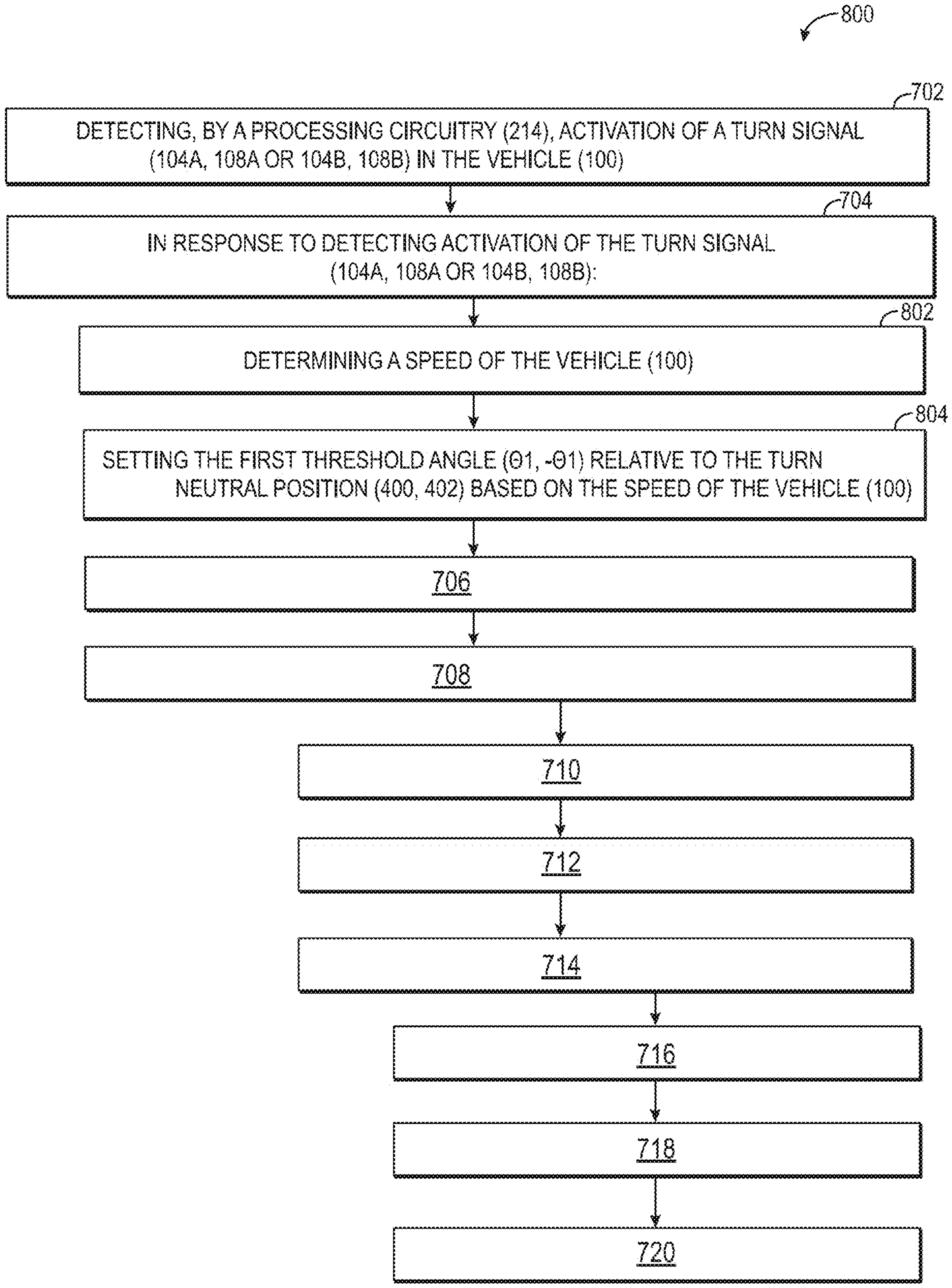
FIG. 8 is a flowchart illustrating another exemplary process of the processing circuitry in the dynamically-controlled automatic turn signal cancellation system in FIG. 2 that includes the process in FIG. 7 to detect a turn and automatically cancel the turn signal, but also includes dynamically setting the first threshold angle of the steering wheel angle used to detect the turn as a function of vehicle speed.

In this regard, FIG. 8 is a flowchart illustrating another exemplary process 800 of the processing circuitry 214 in the dynamically-controlled automatic turn signal cancellation system 208 in FIG. 2 that includes the process 700 in FIG. 7 to detect a turn and automatically cancel the turn signal 104A, 108A or 104B, 108B. However, the process 800 in FIG. 8 also includes dynamically setting the first threshold angle of steering wheel angle A1 or A2 used to detect the turn as function of vehicle 100 speed. Common steps between the process 700 in FIG. 7 and the process 800 in FIG. 8 are shown, while common step numbers between FIG. 7 and FIG. 8 and are not re-discussed. As shown in FIG. 8, the processing circuitry 214 is configured to detect the activation of the turn signal 104A, 108A or 104B, 108B (e.g., based on the turn signal indicator 216 in FIG. 2) like in the process 700 in FIG. 7 (block 702 in FIG. 7). In response to the activation of the turn signal activator 106 (block 704 in FIG. 7), the processing circuitry 214 is configured to detect the steering wheel angle A1 or A2 related to turning of the steering wheel 202 of the vehicle 100, like in the process 700 in FIG. 7. Then, as shown in FIG. 8, the processing circuitry 214 is configured to detect a speed of the vehicle 100 (block 802 in FIG. 8) in response to the activation of the turn signal 104A, 108A or 104B, 108B. The processing circuitry 214 can be configured to receive the current speed 228 of the vehicle 100 from the speedometer 226 as shown in FIG. 2, as an example. The processing circuitry 214 is then configured to set the first threshold angle Θ1, −Θ1 relative to the turn neutral position 400 or 402 based on the speed of the vehicle 100 (block 804 in FIG. 8). The processing circuitry 214 can be configured to the set first threshold angle Θ1, −Θ1 relative to the turn neutral position 400 or 402 based on an inverse relationship with the speed of the vehicle 100. In this manner, the processing circuitry 214 uses the dynamically set first threshold angle Θ1, −Θ1 that is a function of the speed of the vehicle 100 to determine if a turn is detected by the steering wheel angle A1 or A2 exceeding the dynamically set first threshold angle Θ1, −Θ1 (block 706 in FIG. 8).

For example, Tables 1A and 1B below illustrate an exemplary correlation of first threshold angle Θ1, −Θ1 and second threshold angle Θ2, −Θ2 to speed of the vehicle 100 in kilometers (km) per hour (h) (km/h). These correlations can be used to dynamically used to set the first threshold angle Θ1, −Θ1 and/or the second threshold angle Θ2, −Θ2 a function of the speed of the vehicle 100 to determine if a turn is detected by the steering wheel angle A1 or A2 exceeding the dynamically set first threshold angle Θ1, −Θ1 (block 706 in FIG. 8).

TABLE 1A

| | Speed (228) km/hr | | | | | | |
|---|---|---|---|---|---|---|---|
| | 0-5 | 5-10 | 10-15 | 15-20 | 20-25 | 25-30 | 30-35 |
| A1 | 4 | 4 | 4 | 4 | 4 | 2.93 | 1 |
| Θ1 | 0.09 | 0.09 | 0.09 | 0.09 | 0.09 | 0.09 | 0.09 |
| Θ2 | 0.75 | 0.75 | 0.75 | 0.75 | 0.75 | 0.75 | 0.75 |

TABLE 1B

| | Speed (228) km/hr | | | | | | |
|---|---|---|---|---|---|---|---|
| | 35-40 | 40-45 | 45-50 | 50-55 | 55-60 | 60-65 | 65-90 |
| A1 | 1 | 1 | 1 | 1 | 1 | 1 | |
| Θ1 | 0.06 | 0.06 | 0.06 | 0.0552 | 0.0552 | 0.0552 | 0.0552 |
| Θ2 | 0.75 | 0.75 | 0.75 | 0.75 | 0.75 | 0.75 | 0.75 |

The remaining steps in the process 800 in FIG. 8 are the same as in the process 700 in FIG. 7 in this example, as shown by common step numbers.

As an example, if the first threshold angle Θ1, −Θ1 is set to greater than 0.0553 radians by the processing circuitry 214 as a function of the speed of the vehicle 100 as described above, the processing circuitry 214 may use the stability times discussed above based on the maximum steering wheel angle $A_{MAX}$ in the detected turn being less than 0.17 radians, greater than or equal to 0.17 radians and less than 0.19 radians, and greater than 0.19 radians. In another example, if the first threshold angle Θ1, −Θ1 is set to less than or equal to 0.0553 radians by the processing circuitry 214 as a function of the speed of the vehicle 100 as described above, the processing circuitry 214 may be configured to set the stability time to 1.5 seconds irrespective of the determined maximum steering wheel angle $A_{MAX}$ in the detected turn. This is because with a speed of the vehicle 100 being faster, such that the first threshold angle Θ1, −Θ1 is set to less than or equal 0.0553 radians, a larger change in steering wheel angle A1 or A2 and thus a larger slope in the steering wheel angle A1 or A2 is not expected for the turn, and thus the stability time of 1.5 seconds may be sufficient to accurately determine the completion of the turn for automatic turn signal cancellation.

Figure 9B:
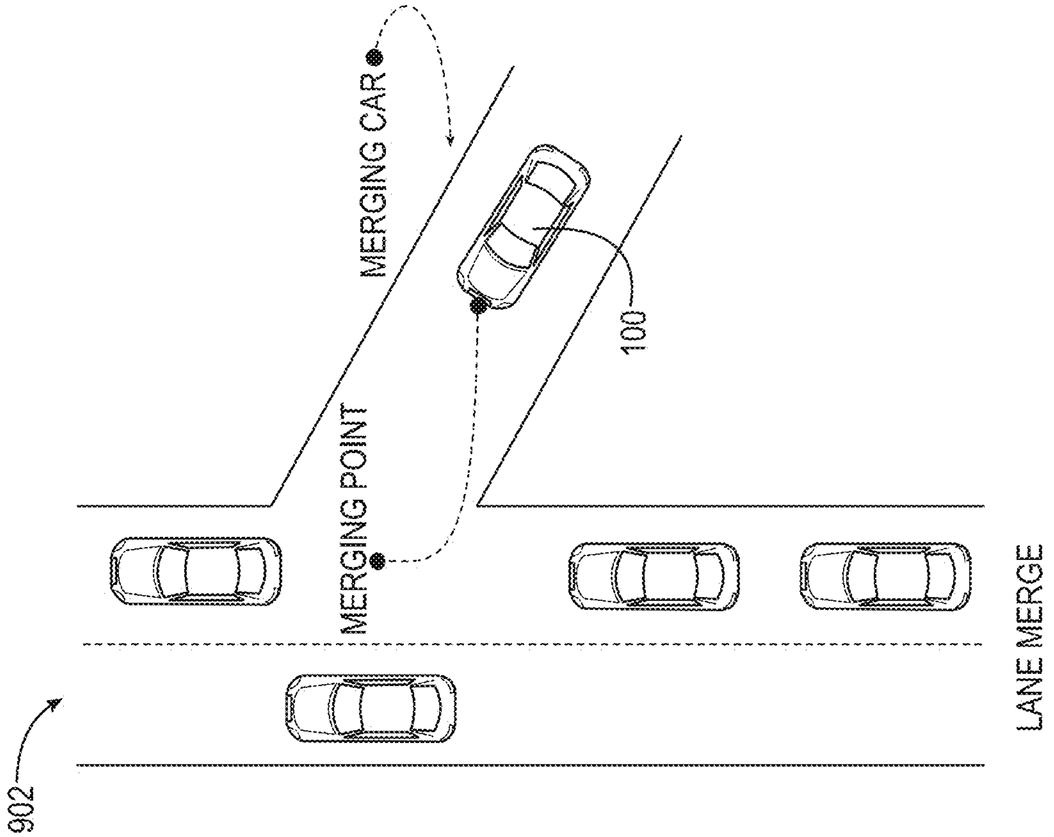
FIGS. 9A and 9B are diagrams of exemplary vehicle highway turns in the form of a lane change and a merge onto a highway, respectively, wherein the steering wheel angle may not significantly change during the highway turn.
Figure 9A:
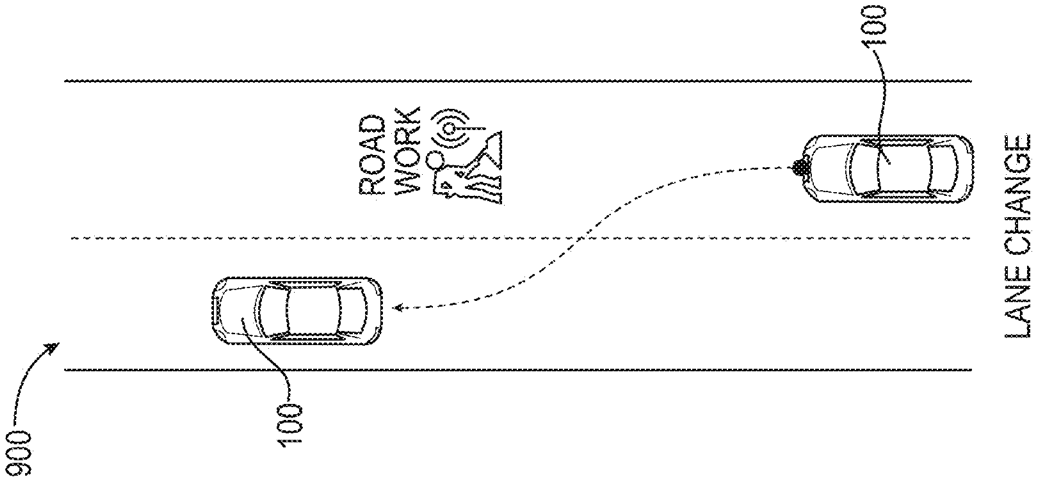

In other exemplary aspects, the dynamically-controlled automatic turn signal cancellation system 208 can also be configured to distinguish between a simple turn (e.g., a simple turn and/or roundabout), as compared to highway turning for automatic turn signal cancellation. Highway turning is turning that does not necessarily involve sharp steering wheel angle A1 or A2 changes, such as when the vehicle 100 performs a highway lane change 900 like shown in FIG. 9A or highway merging 902 like shown in FIG. 9B, or even highway exiting. This is because less steering wheel angle A1 or A2 change is required to perform a turn in a vehicle as at higher speeds that are generally present in highway driving, because the steering wheel angle A1 or A2 change needed to perform a given turn is inversely related to vehicle speed due to increased centripetal force and inertia of the vehicle 100 turn at higher speeds. Thus, in highway turning, the detection of steering wheel angle A1 or A2 used for detection of simple turns and/or roundabouts may not be significant enough to detect highway turning for automatic turn signal cancellation after the highway turn is completed.

Thus, in other exemplary aspects, to be able to cancel a turn signal after completion of a highway turn that is not detectable through steering wheel angle A1 or A2 change based on exceeding the first threshold angle Θ1, −Θ1 (e.g., a dynamically set first threshold angle Θ1, −Θ1 based on vehicle speed), the dynamically-controlled automatic turn signal cancellation system 208 can also be configured to cancel the turn signal 104A, 108A or 104B, 108B based on detecting a highway turn using a secondary turn detection system, such as the secondary turn data system 230 in FIG. 2. For example, the secondary turn data system 230 may be a forward-looking camera (FLC) that can provide forward-looking images as part of the secondary turn data 232, that can be processed by the processing circuitry 214 to detect a highway turn by the vehicle 100 that may not otherwise be detectable using the steering wheel angle A1 or A2 change.

Figure 10:
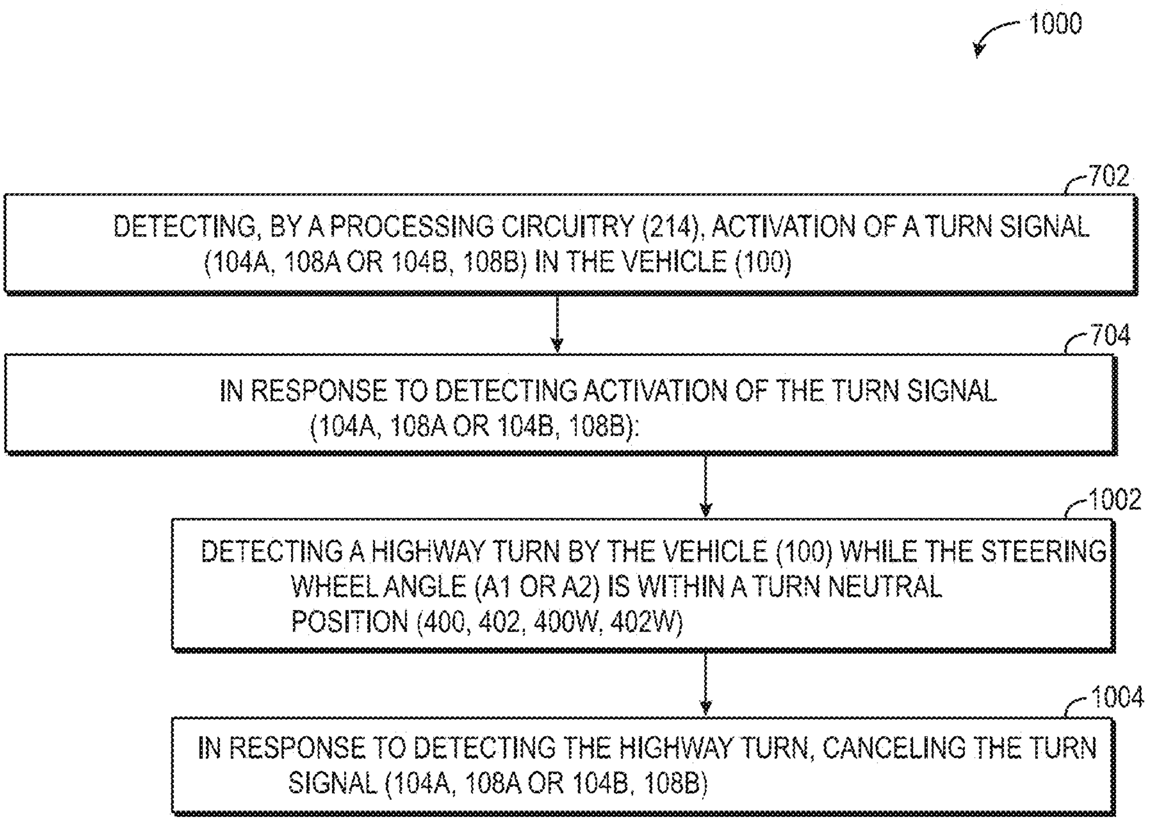
FIG. 10 is a flowchart illustrating an exemplary process of the dynamically-controlled automatic turn signal cancellation system in FIG. 2 also being configured to cancel a turn signal in response to detecting a highway turn when the steering wheel angle is not detected to change significantly enough to signify a vehicle turn.

In this regard, FIG. 10 is a flowchart illustrating an exemplary process 1000 of the dynamically-controlled automatic turn signal cancellation system 208 in FIG. 2 also being configured to cancel a turn signal turn signal 104A, 108A or 104B, 108B of the vehicle 100 in response to detecting a highway turn by the vehicle when the change in steering wheel angle A1 or A2 is not significant enough to be detected as vehicle turn. As discussed above, to accurately provide other automatic turn signal cancellation using the steering wheel angle A1 or A2, the change in steering wheel angle A1 or A2 may have to be significant enough to distinguish an actual turn to prevent false turn signal cancellations. Common steps between the process 700 in FIG. 7 and the process 1000 in FIG. 10 are shown with common step numbers between FIG. 7 and FIG. 10.

As shown in FIG. 10, the processing circuitry 214 is configured to detect this activation of the turn signal 104A, 108A or 104B, 108B (e.g., based on the turn signal indicator 216 in FIG. 2) like in the process 700 in FIG. 7 (block 702 in FIG. 7). In response to the activation of the turn signal activator 106 (block 704 in FIG. 7), the processing circuitry 214 is configured to detect the steering wheel angle A1 or A2 related to turning of the steering wheel 202 of the vehicle 100 like in the process 700 in FIG. 7. Then, as shown in FIG. 10, the processing circuitry 214 is configured to detect a highway turn (e.g., a lane change, a highway merge, a highway exiting) by the vehicle 100 while the steering wheel angle A1 or A2 is within a turn neutral position 400, 402 or turn neutral angle window 400W, 402W, or before the steering wheel angle A1 or A2 exceeds the first threshold angle Θ1, −Θ1 (block 1002 in FIG. 10). The processing circuitry 214 can be configured to detect the highway turn using the secondary turn data 232 from the secondary turn data system 230 as discussed above. For example, the processing circuitry 214 may be configured to detect the highway turn by receiving one or more images (e.g., forward-looking images) from the secondary turn data 232 if the secondary turn data system 230 is a camera or imaging system (e.g., a forward-looking camera (FLC)). As another example, the processing circuitry 214 may be configured to detect the highway turn by receiving secondary turn data 232 as GPS data if the secondary turn data system 230 is a GPS device. In response to detecting the highway turn of the vehicle 100, the processing circuitry 214 is configured to automatically cancel the activated turn signal 104A, 108A or 104B, 108B (block 1004 in FIG. 10).

Figure 11:
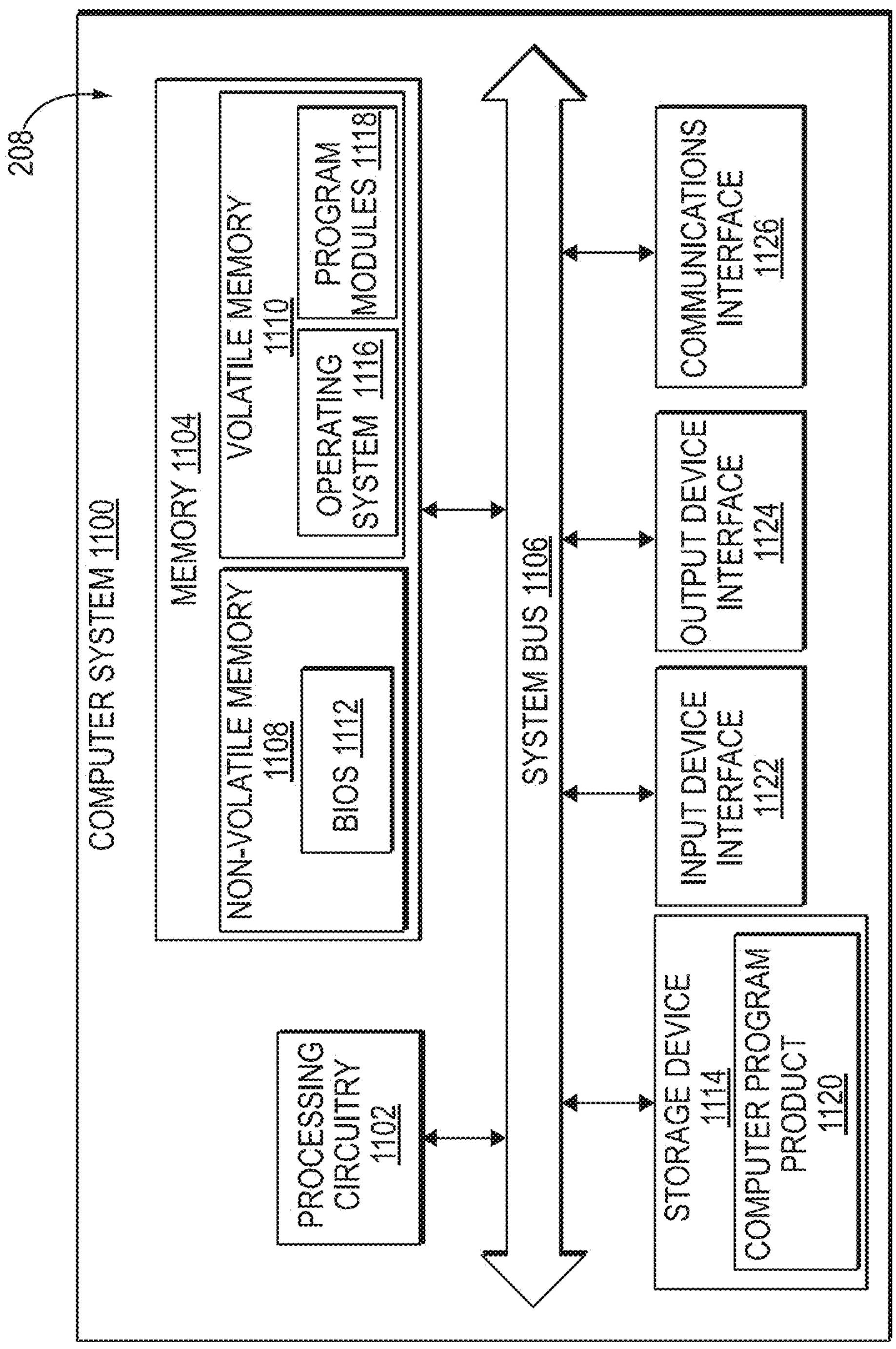
FIG. 11 is a block diagram of an exemplary computer system that can be included in a dynamically-controlled automatic turn signal cancellation system, including but not limited to the dynamically-controlled automatic turn signal cancellation system in FIG. 2, configured to automatically cancel a turn signal based on detecting a completed turn as a function of the steering wheel angle remaining within a turn neutral angle window for a determined stability time, wherein the stability time is dynamically set according to the determined maximum steering wheel angle of the turn.

FIG. 11 is a block diagram of an exemplary computer system 1100 that can be included in a dynamically-controlled automatic turn signal cancellation system, including but not limited to the dynamically-controlled automatic turn signal cancellation system 208 in FIG. 2, configured to automatically cancel a turn signal based on detecting a completed turn as a function of the steering wheel angle remaining within a turn neutral angle window for a determined stability time, wherein the stability time is dynamically set according to the determined maximum steering wheel angle of the turn.

The computer system 1100 is adapted to execute instructions from a computer-readable medium to perform these and/or any of the functions or processing described herein. The computer system 1100 may be connected (e.g., networked) to other machines in a LAN (Local Arca Network), LIN (Local Interconnect Network), automotive network communication protocol (e.g., FlexRay), an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), automatic turn signal cancellation system, processor device, processing circuitry, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1100 may comprise at least one computing device or electronic device capable of including firmware, hardware, and/or executing software instructions to implement the functionality described herein. The computer system 1100 may include processing circuitry 1102 (e.g., processing circuitry including one or more processor devices or control units) that could be the processing circuitry 214 in the dynamically-controlled automatic turn signal cancellation system 208 in FIG. 2. The computer system 1100 also includes a memory 1104 (that could be or include the memory 220 in FIG. 2) and a system bus 1106. The computer system 1100 may include at least one computing device having the processing circuitry 1102. The system bus 1106 provides an interface for system components including, but not limited to, the memory 1104 and the processing circuitry 1102. The processing circuitry 1102 may include any number of hardware components for conducting data or signal processing or for executing computer code stored in memory 1104, including the computer instructions 218 executed by the processing circuitry 214 in the dynamically-controlled automatic turn signal cancellation system 208 in FIG. 2. The processing circuitry 1102 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1102 may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processing circuitry 1102 (e.g., via a circuit or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with processing circuitry 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions (e.g., computer instructions 218), and the like.

Computer-code which is hard or soft coded may be provided in the form of one or more modules. The module(s) can be implemented as software and/or hard-coded in circuitry to implement the functionality described herein in whole or in part. The modules may be stored in the storage device 1114 and/or in the volatile memory 1110, which may include an operating system 1116 and/or one or more program modules 1118. All or a portion of the examples disclosed herein may be implemented as a computer program 1120 stored on a transitory or non-transitory computer-usable or computer-readable storage medium (e.g., single medium or multiple media), such as the storage device 1114, which includes complex programming instructions (e.g., complex computer-readable program code) to cause the processing circuitry 1102 to carry out actions described herein. Thus, the computer-readable program code of the computer program 1120 can comprise software instructions (e.g., computer instructions 218) for implementing the functionality of the examples described herein when executed by the processing circuitry 1102. In some examples, the storage device 1114 may be a computer program product (e.g., readable storage medium) storing the computer program 1120 thereon, where at least a portion of a computer program 1120 may be loadable (e.g., into a processor) for implementing the functionality of the examples described herein when executed by the processing circuitry 1102. The processing circuitry 1102 may serve as a controller or control system for the computer system 1100 that is to implement the functionality described herein.

The computer system 1100 may include an input device interface 1122 configured to receive input and selections to be communicated to the computer system 1100 when executing instructions, such as from a keyboard, mouse, touch-sensitive surface, etc. Such input devices may be connected to the processing circuitry 1102 through the input device interface 1122 coupled to the system bus 1106 but can be connected through other interfaces, such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may include a communications interface 1126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Implementation examples are described in the following numbered clauses:

Example 1: An automatic turn signal cancellation system comprising processing circuitry configured to, in response to activation of a turn signal in a vehicle:

detect a steering wheel angle related to turning of a steering wheel of the vehicle exceeding a first threshold angle from a turn neutral position indicating a turn; and in response to detecting the steering wheel exceeding the first threshold angle:

detect that the steering wheel angle has fallen below a second threshold angle less than the first threshold angle and towards the turn neutral position;

determine a maximum steering wheel angle related to turning of the steering wheel after the steering wheel angle exceeded the first threshold angle; and in response to detecting that the steering wheel angle has fallen below the second threshold angle:

set a stability time based on the determined maximum steering wheel angle;

determine whether the steering wheel angle remains in a turn neutral angle window for the set stability time; and in response to determining the steering wheel angle remains in the turn neutral angle window for the set stability time, cancel the turn signal.

Example 2: The automatic turn signal cancellation system of Example 1, wherein the processing circuitry is further configured to, in response to determining the steering wheel angle does not remain in the turn neutral angle window for the set stability time, not cancel the turn signal.

Example 3: The automatic turn signal cancellation system of any of Examples 1-2, wherein the processing circuitry is configured to set the stability time inversely to the determined maximum steering wheel angle.

Example 4: The automatic turn signal cancellation system of any of Examples 1-3, wherein the processing circuitry is configured to set the stability time to less than or equal to three (3) seconds and greater than two (2) seconds based on the determined maximum steering wheel angle.

Example 5: The automatic turn signal cancellation system of Example 4, wherein the processing circuitry is configured to set the stability time to the less than or equal to three (3) seconds and greater than two (2) seconds based on the determined maximum steering wheel angle being less than +/−0.17 radians.

Example 6: The automatic turn signal cancellation system of any of Examples 1-3, wherein the processing circuitry is configured to set the stability time to less than or equal to two (2) seconds and greater than 1.6 seconds based on the determined maximum steering wheel angle.

Example 7: The automatic turn signal cancellation system of Example 6, wherein the processing circuitry is configured to set the determined stability time to the less than or equal to two (2) seconds and greater than 1.6 seconds based on the determined maximum steering wheel angle being greater than or equal to +/−0.17 radians and less than +/−0.19 radians.

Example 8: The automatic turn signal cancellation system of any of Examples 1-3, wherein the processing circuitry is configured to set the stability time to less than or equal to 1.6 seconds, based on the determined maximum steering wheel angle.

Example 9: The automatic turn signal cancellation system of Example 8, wherein the processing circuitry is configured to set the determined stability time to the less than or equal to 1.6 seconds based on the determined maximum steering wheel angle being greater than or equal to +/−0.19 radians.

Example 10: The automatic turn signal cancellation system of any of Examples 1-9, wherein the processing circuitry is further configured to, in response to activation of the turn signal in the vehicle:

determine a speed of the vehicle; and set the first threshold angle relative to the turn neutral position based on the speed of the vehicle.

Example 11: The automatic turn signal cancellation system of Example 10, wherein the processing circuitry is configured to set the first threshold angle relative to the turn neutral position of the steering wheel inversely to the speed of the vehicle.

Example 12: The automatic turn signal cancellation system of any of Examples 10-11, wherein the processing circuitry is configured to:

detect the steering wheel angle exceeding the first threshold angle in the direction of the turn signal; and in response to detecting the steering wheel angle exceeding the first threshold angle in the direction of the turn signal:

detect that the steering wheel angle has fallen below the second threshold angle less than the first threshold angle towards the turn neutral position; and in response to detecting that the steering wheel angle has fallen below the second threshold angle:

determine the maximum steering wheel angle after the steering wheel angle exceeded the first threshold angle;

set the stability time based on the determined maximum steering wheel angle;

determine whether the steering wheel angle remains in the turn neutral angle window for the set stability time; and in response to determining the steering wheel angle remains in the turn neutral angle window for the set stability time, cancel the turn signal.

Example 13: The automatic turn signal cancellation system of any of Examples 10-12, wherein the processing circuitry is configured to, in response to the first threshold angle being set to less than or equal to +/−0.0553 radians, set the determined stability time to less than or equal to 1.5 seconds.

Example 14: The automatic turn signal cancellation system of any of Examples 1-13, wherein the turn neutral angle window is between −1 radian and 1 radian.

Example 15: The automatic turn signal cancellation system of any of Examples 1-14, wherein, in response to activation of the turn signal, the processing circuitry is further configured to:

detect a highway turn by the vehicle while the steering wheel angle is within the turn neutral position; and in response to detecting the highway turn, cancel the turn signal.

Example 16: The automatic turn signal cancellation system of Example 15, wherein the processing circuitry is configured to detect the highway turn by being configured to:

receive at least one image from an imaging system; and determine whether the highway turn occurred based on the received at least one image.

Example 17: The automatic turn signal cancellation system of Example 16, wherein the imaging system comprises a forward-looking camera configured to capture images of a forward-looking perspective from the vehicle.

Example 18: The automatic turn signal cancellation system of Example 15, wherein the processing circuitry is configured to detect the highway turn by being configured to:

receive turn data of the vehicle generated by a global-positioning system (GPS); and determine whether the highway turn occurred based on the received turn data.

Example 19: A vehicle comprising the automatic turn signal cancellation system of any of Examples 1-18.

Example 20: The vehicle of Example 19, further comprising a steering wheel angle sensor configured to generate a steering wheel angle signal indicative of the steering wheel angle.

Example 21: A method of automatically canceling a turn signal in a vehicle, comprising:

detecting, by a processing circuitry, activation of a turn signal in the vehicle; and in response to detecting activation of the turn signal:

detecting, by the processing circuitry, a steering wheel angle related to turning of a steering wheel of the vehicle exceeding a first threshold angle from a turn neutral position indicating a turn; and in response to the processing circuitry detecting the steering wheel angle exceeding the first threshold angle:

detecting, by the processing circuitry, that the steering wheel angle has fallen below a second threshold angle less than the first threshold angle and towards the turn neutral position;

determining, by the processing circuitry, a maximum steering wheel angle related to turning of the steering wheel after the steering wheel angle exceeded the first threshold angle; and in response to the processing circuitry detecting that the steering wheel angle has fallen below the second threshold angle:

setting, by the processing circuitry, a stability time based on the determined maximum steering wheel angle;

determining, by the processing circuitry, whether the steering wheel angle remains in a turn neutral angle window for the set stability time; and canceling, by the processing circuitry, the turn signal in response to determining the steering wheel angle remains in the turn neutral angle window for the set stability time.

Example 22: The method of Example 21, further comprising, in response to activation of the turn signal in the vehicle:

determining a speed of the vehicle; and setting the first threshold angle relative to the turn neutral position based on the speed of the vehicle.

Example 23: A computer program product comprising program code for performing, when executed by the processing circuitry, the method of Example 21.

Example 24: A non-transitory computer-readable storage medium comprising instructions, which, when executed by the processing circuitry, cause the processing circuitry to perform the method of Example 21.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An automatic turn signal cancellation system comprising processing circuitry configured to, in response to activation of a turn signal in a vehicle:

detect a steering wheel angle related to turning of a steering wheel of the vehicle exceeding a first threshold angle from a turn neutral position indicating a turn; and in response to detecting the steering wheel exceeding the first threshold angle:

detect that the steering wheel angle has fallen below a second threshold angle less than the first threshold angle and towards the turn neutral position;

determine a maximum steering wheel angle related to turning of the steering wheel after the steering wheel angle exceeded the first threshold angle; and in response to detecting that the steering wheel angle has fallen below the second threshold angle:

set a stability time based on the determined maximum steering wheel angle;

determine whether the steering wheel angle remains in a turn neutral angle window for the set stability time; and in response to determining the steering wheel angle remains in the turn neutral angle window for the set stability time, cancel the turn signal.

2. The automatic turn signal cancellation system of claim 1, wherein the processing circuitry is further configured to, in response to determining the steering wheel angle does not remain in the turn neutral angle window for the set stability time, not cancel the turn signal.

3. The automatic turn signal cancellation system of claim 1, wherein the processing circuitry is configured to set the stability time inversely to the determined maximum steering wheel angle.

4. The automatic turn signal cancellation system of claim 1, wherein the processing circuitry is configured to set the stability time to less than or equal to three (3) seconds and greater than two (2) seconds based on the determined maximum steering wheel angle.

5. The automatic turn signal cancellation system of claim 1, wherein the processing circuitry is further configured to, in response to activation of the turn signal in the vehicle:
determine a speed of the vehicle; and
set the first threshold angle relative to the turn neutral position based on the speed of the vehicle.

6. The automatic turn signal cancellation system of claim 5, wherein the processing circuitry is configured to set the first threshold angle relative to the turn neutral position of the steering wheel inversely to the speed of the vehicle.

7. The automatic turn signal cancellation system of claim 5, wherein the processing circuitry is configured to:
detect the steering wheel angle exceeding the first threshold angle in the direction of the turn signal; and
in response to detecting the steering wheel angle exceeding the first threshold angle in the direction of the turn signal:
detect that the steering wheel angle has fallen below the second threshold angle less than the first threshold angle towards the turn neutral position; and
in response to detecting that the steering wheel angle has fallen below the second threshold angle:
determine the maximum steering wheel angle after the steering wheel angle exceeded the first threshold angle;
set the stability time based on the determined maximum steering wheel angle;
determine whether the steering wheel angle remains in the turn neutral angle window for the set stability time; and
in response to determining the steering wheel angle remains in the turn neutral angle window for the set stability time, cancel the turn signal.

8. The automatic turn signal cancellation system of claim 1, wherein the processing circuitry is configured to set the stability time to less than or equal to two (2) seconds and greater than 1.6 seconds based on the determined maximum steering wheel angle.

9. The automatic turn signal cancellation system of claim 1, wherein the processing circuitry is configured to set the stability time to less than or equal to 1.6 seconds, based on the determined maximum steering wheel angle.

10. The automatic turn signal cancellation system of claim 1, wherein the turn neutral angle window is between −1 radian and 1 radian.

11. The automatic turn signal cancellation system of claim 1, wherein, in response to activation of the turn signal, the processing circuitry is further configured to:
detect a highway turn by the vehicle while the steering wheel angle is within the turn neutral position; and
in response to detecting the highway turn, cancel the turn signal.

12. The automatic turn signal cancellation system of claim 11, wherein the processing circuitry is configured to detect the highway turn by being configured to:
receive at least one image from an imaging system; and
determine whether the highway turn occurred based on the received at least one image.

13. The automatic turn signal cancellation system of claim 12, wherein the imaging system comprises a forward-looking camera configured to capture images of a forward-looking perspective from the vehicle.

14. The automatic turn signal cancellation system of claim 11, wherein the processing circuitry is configured to detect the highway turn by being configured to:
receive turn data of the vehicle generated by a global-positioning system (GPS); and
determine whether the highway turn occurred based on the received turn data.

15. A vehicle comprising the automatic turn signal cancellation system of claim 1.

16. The vehicle of claim 15, further comprising a steering wheel angle sensor configured to generate a steering wheel angle signal indicative of the steering wheel angle.

17. A method of automatically canceling a turn signal in a vehicle, comprising: detecting, by a processing circuitry, activation of a turn signal in the vehicle; and in response to detecting activation of the turn signal:
detecting, by the processing circuitry, a steering wheel angle related to turning of a steering wheel of the vehicle exceeding a first threshold angle from a turn neutral position indicating a turn; and
in response to the processing circuitry detecting the steering wheel angle exceeding the first threshold angle:
detecting, by the processing circuitry, that the steering wheel angle has fallen below a second threshold angle less than the first threshold angle and towards the turn neutral position;
determining, by the processing circuitry, a maximum steering wheel angle related to turning of the steering wheel after the steering wheel angle exceeded the first threshold angle; and
in response to the processing circuitry detecting that the steering wheel angle has fallen below the second threshold angle:
setting, by the processing circuitry, a stability time based on the determined maximum steering wheel angle;
determining, by the processing circuitry, whether the steering wheel angle remains in a turn neutral angle window for the set stability time; and
canceling, by the processing circuitry, the turn signal in response to determining the steering wheel angle remains in the turn neutral angle window for the set stability time.

18. The method of claim 17, further comprising, in response to activation of the turn signal in the vehicle:
determining a speed of the vehicle; and
setting the first threshold angle relative to the turn neutral position based on the speed of the vehicle.

19. A non-transitory computer-readable storage medium comprising instructions, which, when executed by the processing circuitry, cause the processing circuitry to perform the method of claim 17.

* * * * *